United States Patent
Prasad et al.

(10) Patent No.: US 11,727,403 B2
(45) Date of Patent: Aug. 15, 2023

(54) SYSTEM AND METHOD FOR PAYMENT AUTHENTICATION

(71) Applicant: Samsung Electronics Co., Ltd., Suwon-si (KR)

(72) Inventors: Shyam Prasad, Rye Brook, NY (US); Yulia Rabina, San Jose, CA (US); Hashir Khan, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/876,838

(22) Filed: May 18, 2020

(65) Prior Publication Data

US 2020/0372513 A1 Nov. 26, 2020

Related U.S. Application Data

(60) Provisional application No. 62/850,380, filed on May 20, 2019.

(51) Int. Cl.
*G06Q 20/40* (2012.01)
*G06F 21/32* (2013.01)

(52) U.S. Cl.
CPC ....... *G06Q 20/40145* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 8,308,063 B2 | 11/2012 | Bykov et al. | |
| 9,009,476 B2 | 4/2015 | Zhuang et al. | |
| 2012/0330787 A1 | 12/2012 | Hanson et al. | |
| 2016/0019547 A1 | 1/2016 | Gumani et al. | |
| 2017/0068955 A1* | 3/2017 | Agarwal | G06Q 20/3829 |
| 2018/0335928 A1* | 11/2018 | Van Os | G06Q 20/405 |
| 2019/0012676 A1 | 1/2019 | Gilbey et al. | |

(Continued)

FOREIGN PATENT DOCUMENTS

| | | |
|---|---|---|
| KR | 1020140069517 A | 6/2014 |
| KR | 1020140137223 A | 12/2014 |

(Continued)

OTHER PUBLICATIONS

International Search Report and Written Opinion of the International Searching Authority in connection with International Application No. PCT/KR2020/006596 dated Oct. 14, 2020, 7 pages.

(Continued)

*Primary Examiner* — Scott S Trotter
*Assistant Examiner* — Amit Patel

(57) ABSTRACT

A method, an electronic device, and computer readable medium for payment authentication are provided. The method includes receiving a device user authentication. The method also includes receiving a payment request. The method additionally includes determining whether one or more payment conditions corresponding to the device user authentication are satisfied upon receipt of the payment request. The method further includes authorizing a payment application to process the payment request when the one or more payment conditions is satisfied.

20 Claims, 9 Drawing Sheets

(56) References Cited

U.S. PATENT DOCUMENTS

2019/0139040 A1 5/2019 Khan
2020/0402065 A1* 12/2020 Kapur .................... G06Q 20/20

FOREIGN PATENT DOCUMENTS

| KR | 10-2015-0142532 A | 12/2015 |
| KR | 10-1803396 B1 | 12/2017 |
| KR | 101849209 B1 | 5/2018 |
| KR | 1020180131214 A | 12/2018 |
| KR | 102052959 B1 | 12/2019 |
| WO | 2015/013548 A1 | 1/2015 |
| WO | 2019059964 A1 | 3/2019 |

OTHER PUBLICATIONS

Sena, Josias, "Using the Android Keystore System to Store and Retrieve Sensitive Information", https://medium.com/@josiassena/using-the-android-keystore-system-to-store-sensitive-information-3a56175a454b, Feb. 12, 2017, 8 pages.

"Android Keystore System", https://developer.android.com/training/articles/keystore, Dec. 27, 2019, 15 pages.

Supplementary European Search Report dated Oct. 8, 2021 in connection with European Patent Application No. 20 81 0302, 7 pages.

Communication pursuant to Article 94(3) EPC dated Feb. 14, 2023 in connection with European Patent Application No. 20810302.8, 5 pages.

* cited by examiner

SYSTEM AND METHOD FOR PAYMENT AUTHENTICATION

CROSS-REFERENCE TO RELATED APPLICATION AND CLAIM OF PRIORITY

This application claims priority under 35 U.S.C. § 119(e) to U.S. Provisional Patent Application No. 62/850,380 filed on May 20, 2019. The above-identified provisional patent application is hereby incorporated by reference in its entirety.

TECHNICAL FIELD

This disclosure relates generally to secure processing of payments using an electronic device. More specifically, this disclosure relates to efficient and secure processing of payments with user authentication.

BACKGROUND

In existing situations for mobile payment authentication, each individual payment must gather authentication results from device authenticators (e.g., fingerprint, iris, facial recognition, passcode, personal identification number (PIN), etc.) prior to allowing a payment transaction to be processed. These additional steps can cause delays or even interruptions in the payment process from a purchaser perspective as they can lead to transactions timing out and having to be reinitiated or other errors. Solutions are needed for such problems involving mobile payment authentication.

SUMMARY

This disclosure provides systems and methods for payment authentication by an electronic device that enables robust security while avoiding unnecessary or repeated user authentication processes.

In a first embodiment, a method includes receiving a device user authentication. The method also includes receiving a payment request. The method additionally includes determining whether one or more payment conditions corresponding to the device user authentication are satisfied upon receipt of the payment request. The method further includes authorizing a payment application to process the payment request when the one or more payment conditions is satisfied.

In a second embodiment, an electronic device includes a processor and a memory operably coupled to the processor. The memory includes instructions executable by the processor to receive a device user authentication. The memory includes instructions executable by the processor to receive a payment request. The memory includes instructions executable by the processor to determine whether one or more payment conditions corresponding to the device user authentication are satisfied upon receipt of the payment request. The memory includes instructions executable by the processor to authorize a payment application to process the payment request when the one or more payment conditions is satisfied.

In a third embodiment, a non-transitory machine-readable medium contains instructions that, when executed, cause at least one processor of an electronic device to receive a device user authentication. The instructions, when executed, cause the at least one processor of the electronic device to receive a payment request. The instructions, when executed, cause the at least one processor of the electronic device to determine whether one or more payment conditions corresponding to the device user authentication are satisfied upon receipt of the payment request. The instructions, when executed, cause the at least one processor of the electronic device to authorize a payment application to process the payment request when the one or more payment conditions is satisfied.

In various embodiments, the one or more payment conditions include a valid authorization time period, and the determining whether the one or more payment conditions are satisfied includes determining whether the payment request was received within the valid authorization time period with respect to the device user authentication. In various embodiments, the one or more payment conditions include a biometric authentication requirement and the determining whether the one or more payment conditions are satisfied includes determining whether the device user authentication satisfies the biometric authentication requirement. In various embodiments, the one or more payment conditions include a gatekeeper authentication requirement and the determining whether the one or more payment conditions are satisfied includes determining whether the device user authentication satisfies the gatekeeper authentication requirement. In various embodiments, the one or more payment conditions include an unlock requirement and the determining whether the one or more payment conditions are satisfied includes determining whether the device is unlocked. In various embodiments, the determining whether the one or more payment conditions are satisfied includes accessing a payment authorization key in a key storage and reading the payment conditions corresponding to the payment authorization key. In various embodiments, the key storage is an operating-system-based key storage system.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application," "app," and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
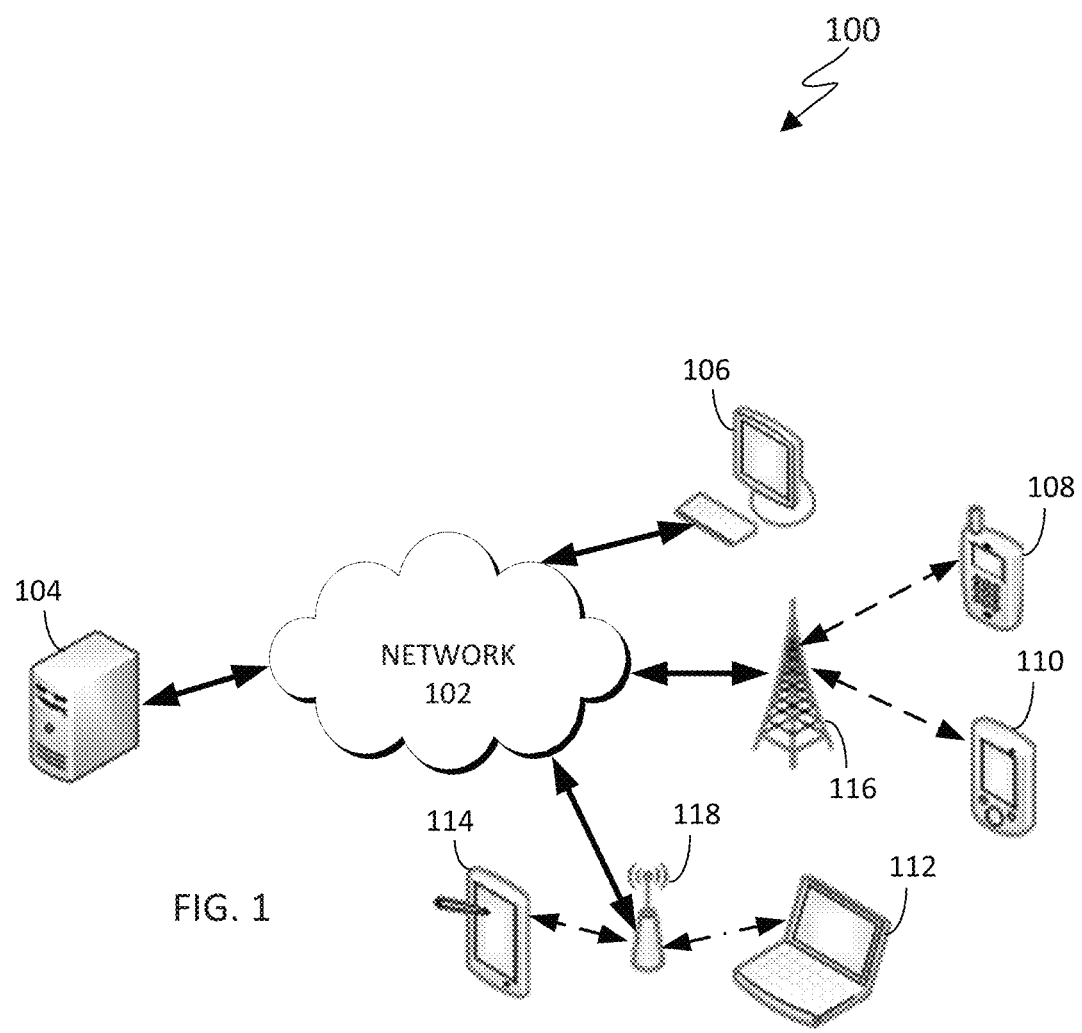
FIG. 1 illustrates an example communication system in accordance with an embodiment of this disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Disclosed embodiments improve upon current payment transaction processes in electronic devices by allowing payments to be processed without an additional or repeated user-authentication process as long as the payment request conforms to payment conditions, such as may be specified in key access rules, that can ensure the security of the transaction. Disclosed processes improve the operation of the electronic device itself by eliminating unnecessary, repetitive authentication processes and improve the efficiency of device processing by storing authentication results for automatic re-authorization in accordance with the payment conditions. Further, disclosed embodiments can exploit secure key storage capabilities of an operating system trusted execution environment, proving efficiencies over devices that must perform additional processes by a payment subsystem. Disclosed embodiments also provide an improved user experience for more efficient transaction processing.

An electronic device, according to embodiments of the present disclosure, can include a personal computer (such as a laptop computer, a desktop computer, and a tablet computer), a workstation, a server, a television, an appliance, and the like. Additionally, the electronic device can be at least one of a part of a piece of furniture or building/structure, an electronic board, an electronic signature receiving device, a projector, a security control panel, a gamming console, or a measurement device. In certain embodiments, the electronic device can be a portable electronic device such as a portable communication device (such as a smartphone or mobile phone), a laptop, a tablet, an electronic book reader (such as an e-reader), a personal digital assistants (PDAs), a portable multimedia player (PMPs), a MP3 player, a mobile medical device, a virtual reality headset, a portable game console, a camera, and a wearable device (smart glasses, head mounted display, rings, bracelets, watches), electronic cloths, among others. The electronic device is one or a combination of the above-listed devices. Additionally, the electronic device as disclosed herein is not limited to the above-listed devices and can include new electronic devices depending on the development of technology.

An electronic device, according to embodiments of the present disclosure, can implement a trusted execution environment (TEE), such as in a secure area of a main processor and under control of an operating system. A TEE can act as an isolated execution environment to provide security features such as isolated execution, integrity of applications executing with the TEE, along with confidentiality of application assets. The TEE may be a secure operating environment and may include a hardware component and a software component (e.g., the TRUSTZONE operating environment). In general, the TEE may execute secure applications, with limited access to other elements and components of the electronic device. Similarly, applications executing outside the trusted execution environment have limited or no access to applications executing inside the trusted execution environment.

In various disclosed embodiments, the TEE can include one or more trusted applications ("trusted apps"). The trusted apps in the TEE can include device authenticator trusted apps that collect user authentication data. The user authentication data can include biometric data such as fingerprints, iris images, and facial images. The user authentication data can include gatekeeper data such as PINs, passcodes, patterns, and others. The trusted apps in the TEE can include an authentication trusted app that performs such functions as collecting and integrating user authentication data and verifying its validity. The trusted apps in the TEE can include payment trusted apps that, when properly authorized, perform payment processing according to financial service provider requirements, e.g., VISA, MASTERCARD, AMERICAN EXPRESS, or other financial service providers. The trusted apps in the TEE can include other trusted apps, such as gatekeeper trusted apps, attestation trusted apps, key storage trusted apps, and others.

In other embodiments, a hardware-based secure element can be used in place of the TEE on the device processor and can implement any of the features described herein. In an embodiment, the hardware based secure element may be separate from the processor.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head-mounted display (HMD), virtual assistant, or the like, each capable of acting as an electronic device as described herein. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each client device 106-114 represents any suitable computing or processing device that interacts with at least one server (such as the server 104) or other computing device(s) over the network 102. In this example, the client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. As described in more detail below, an electronic device (such as the desktop computer 106, mobile device 108, PDA 110, laptop computer 112, or tablet computer 114) can process payments as described herein, whether via an interaction with another device, as an interaction between applications on the same device, or otherwise.

In this example, some client devices 108-114 communicate indirectly with the network 102. For example, the client devices 108 and 110 (mobile device 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In some embodiments, any of the client devices 106-114 transmits information securely and efficiently to another device, such as, for example, the server 104. Also, any of the client devices 106-114 can trigger the information transmission between itself and server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
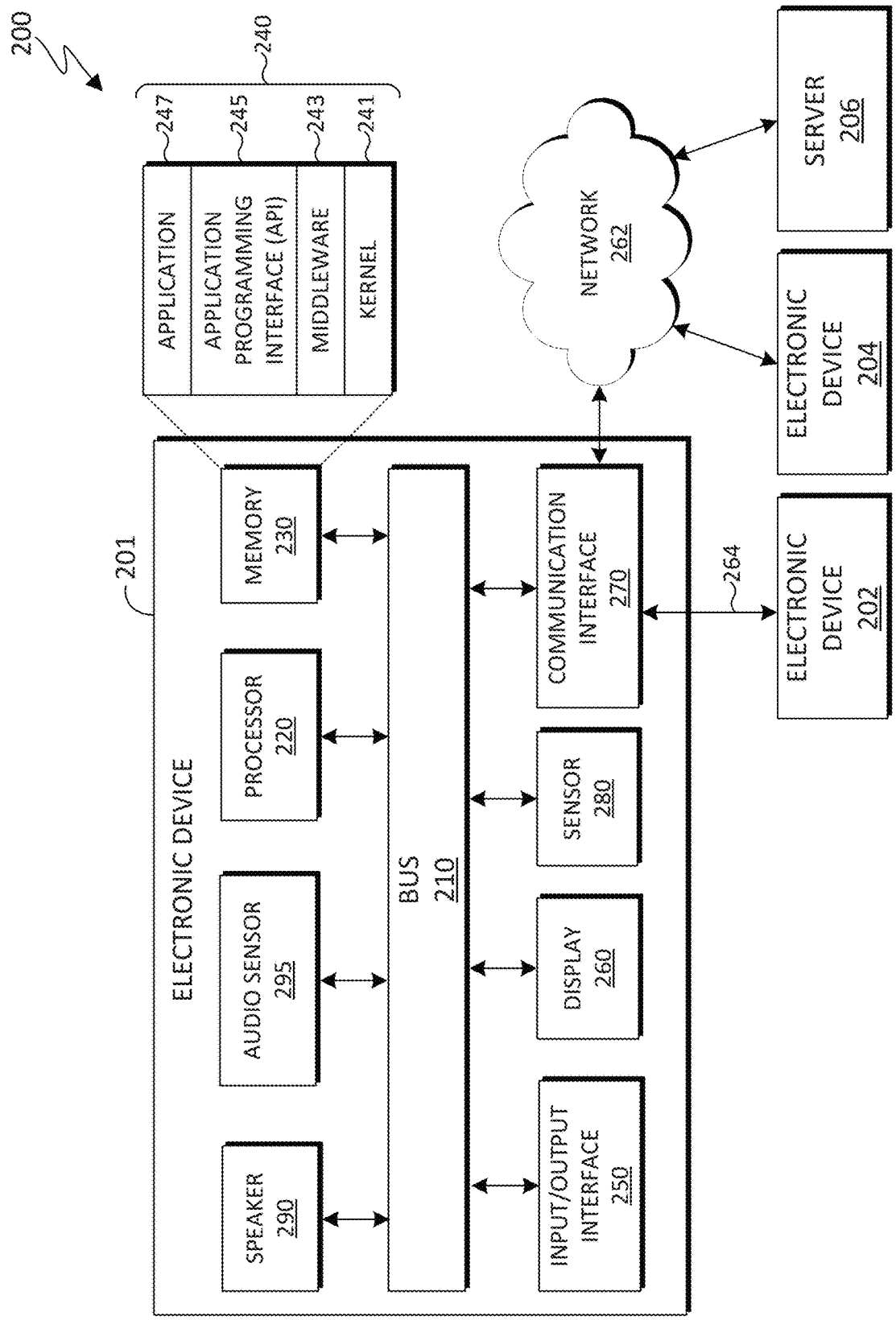
FIG. 2 illustrates an example network configuration including electronic devices in accordance with this disclosure.

FIG. 2 illustrates an example network configuration 200 including electronic devices in accordance with this disclosure. The embodiment of the network configuration 200 shown in FIG. 2 is for illustration only. Other embodiments of the network configuration 200 could be used without departing from the scope of this disclosure.

According to embodiments of this disclosure, an electronic device 201 is included in the network configuration 200. The electronic device 201 can be similar to any of the client devices 106-114 of FIG. 1. The electronic device 201 can include at least one of a bus 210, a processor 220, a memory 230, an input/output (I/O) interface 250, a display 260, a communication interface 270, one or more sensors 280, a speaker 290, or a microphone. In some embodiments, the electronic device 201 may exclude at least one of these components or may add at least one other component. The bus 210 includes a circuit for connecting the components 220-295 with one another and for transferring communications (such as control messages and/or data) between the components.

The processor 220 includes one or more of a central processing unit (CPU), a graphics processor unit (GPU), an application processor (AP), or a communication processor (CP). The processor 220 is able to perform control on at least one of the other components of the electronic device 201 and/or perform an operation or data processing relating to communication. In certain embodiments, the processor 220 performs payment processing and authentication processes as described herein.

The memory 230 can include a volatile and/or non-volatile memory. For example, the memory 230 can store commands or data related to at least one other component of the electronic device 201. According to embodiments of this disclosure, the memory 230 can store software and/or a program 240. The program 240 includes, for example, a kernel 241, middleware 243, an application programming interface (API) 245, and/or an application program (or "application") 247. At least a portion of the kernel 241, middleware 243, or API 245 may be denoted as an operating system (OS). Different portions of memory 230 and/or a memory in processor 220 can be designated for use as a rich execution environment (REE) and a trusted execution environment (TEE).

The kernel 241 can control or manage system resources (such as the bus 210, processor 220, or memory 230) used to perform operations or functions implemented in other programs (such as the middleware 243, API 245, or application 247). The kernel 241 provides an interface that allows the middleware 243, the API 245, or the application 247 to access the individual components of the electronic device 201 to control or manage the system resources. The application 247 includes one or more applications for payment processing and authentication functions as discussed below. These functions can be performed by a single application or by multiple applications that each carries out one or more of these functions. The middleware 243 can function as a relay to allow the API 245 or the application 247 to communicate data with the kernel 241, for instance. A plurality of applications 247 can be provided. The middleware 243 is able to control work requests received from the applications 247, such as by allocating the priority of using the system resources of the electronic device 201 (like the bus 210, the processor 220, or the memory 230) to at least one of the plurality of applications 247. The API 245 is an interface allowing the application 247 to control functions provided from the kernel 241 or the middleware 243. For example, the API 245 includes at least one interface or function (such as a command) for filing control, window control, image processing, or text control.

The I/O interface 250 serves as an interface that can, for example, transfer commands or data input from a user or other external devices to other component(s) of the electronic device 201. The I/O interface 250 can also output commands or data received from other component(s) of the electronic device 201 to the user or the other external device.

The display 260 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 260 can also be a depth-aware display, such as a multi-focal display. The display 260 is able to display, for example, various contents (such as text, images, videos, icons, or symbols) to the user. The display 260 can include a touchscreen and may receive, for example, a touch, gesture, proximity, or hovering input using an electronic pen or a body portion of the user.

The communication interface 270, for example, is able to set up communication between the electronic device 201 and an external electronic device (such as an electronic device 202, a second electronic device 204, or a server 206). For example, the communication interface 270 can be connected with a network 262 or 264 through wireless or wired communication to communicate with the external electronic device. The communication interface 270 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless universal serial bus (USB), code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a USB, high definition multimedia interface (HDMI), recommended standard 232 (RS-232), or plain old telephone service (POTS). The network 262 or 264 includes at least one communication network, such as a computer network (like a local area network (LAN) or wide area network (WAN)), Internet, or a telephone network.

The electronic device 201 further includes one or more sensors 280 that can meter a physical quantity or detect an activation state of the electronic device 201 and convert metered or detected information into an electrical signal. For example, one or more sensors 280 can include one or more cameras or other imaging sensors for capturing images of scenes. The sensor(s) 280 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 280 can further include an inertial measurement unit, which can include one or more accelerometers, gyroscopes, and other components. In addition, the sensor(s) 280 can include a control circuit for controlling at least one of the sensors included here. Any of these sensor(s) 280 can be located within the electronic device 201.

Sensors 280 can be used as input devices for user authentication, such as implementing a touchscreen or buttons for receiving passcodes, PINs, or patterns, a fingerprint sensor for scanning a user's fingerprint, a camera for iris or facial recognition, and the like.

The electronic device 201 further includes one or more speakers 290 that convert electrical signals into sound and one or more audio sensors 295 that convert sound into electrical signals. The audio sensor 295 can be a microphone similar to a dynamic microphone, a condenser microphone, a piezoelectric microphone, or the like.

The external electronic device 202 and the external electronic device 204 can be similar to any of the client devices 106-114 of FIG. 1. The external electronic devices 202 and 204 can include the same or similar components 210-295 as the electronic device 201 (or a suitable subset thereof). Additionally, the external electronic devices 202 and 204 can be a wearable device or an electronic device-mountable wearable device (such as an HMD). When the electronic device 201 is mounted in the electronic device 202 (such as the HMD), the electronic device 201 can communicate with the electronic device 202 through the communication interface 270. The electronic device 201 can be directly connected with the electronic device 202 to communicate with the electronic device 202 without involving with a separate network.

The external electronic devices 202 and 204 and the server 206 each can be a device of the same or a different type from the electronic device 201. According to certain embodiments of this disclosure, the server 206 includes a group of one or more servers. The server 206 can be similar to the server 104 of FIG. 1. Also, according to certain embodiments of this disclosure, all or some of the operations executed on the electronic device 201 can be executed on another or multiple other electronic devices (such as the electronic devices 202 and 204 or server 206). Further, according to certain embodiments of this disclosure, when the electronic device 201 should perform some function or service automatically or at a request, the electronic device 201, instead of executing the function or service on its own or additionally, can request another device (such as electronic devices 202 and 204 or server 206) to perform at least some functions associated therewith. The other electronic device (such as electronic devices 202 and 204 or server 206) is able to execute the requested functions or additional functions and transfer a result of the execution to the electronic device 201. The electronic device 201 can provide a requested function or service by processing the received result as it is or additionally. To that end, a cloud computing, distributed computing, or client-server computing technique may be used, for example. While FIG. 2 shows that the electronic device 201 includes the communication interface 270 to communicate with the external electronic device 204 or server 206 via the network 262 or 264, the electronic device 201 may be independently operated without a separate communication function according to some embodiments of this disclosure.

The server 206 can include the same or similar components 210-295 as the electronic device 201 (or a suitable subset thereof). The server 206 can support to drive the electronic device 201 by performing at least one of operations (or functions) implemented on the electronic device 201. For example, the server 206 can include a processing module or processor that may support the processor 220 implemented in the electronic device 201. In certain embodiments, the server 206 performs the natural language processing.

Although FIG. 2 illustrates one example of a network configuration 200 including an electronic device 201, various changes may be made to FIG. 2. For example, the network configuration 200 could include any number of each component in any suitable arrangement. In general, computing and communication systems come in a wide variety of configurations, and FIG. 2 does not limit the scope of this disclosure to any particular configuration. Also, while FIG. 2 illustrates one operational environment in which various features disclosed in this patent document can be used, these features could be used in any other suitable system.

Figure 3:
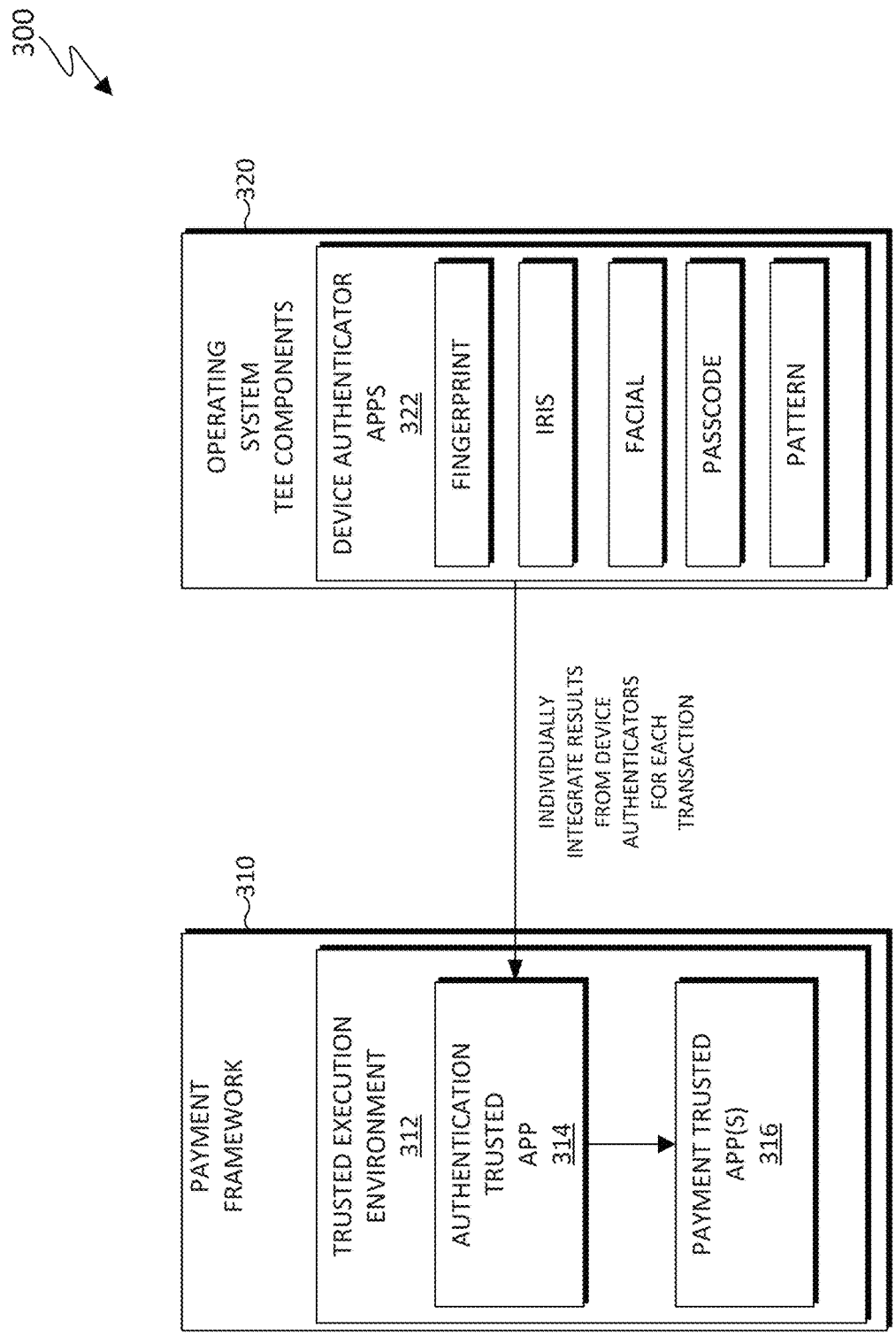
FIG. 3 illustrates a block diagram of an example of payment processing elements of an electronic device.

FIG. 3 illustrates a block diagram of an example of payment processing elements of an electronic device 300. Electronic device 300 can be, for example, an electronic device 201 as illustrated in FIG. 2, any of the client devices 106-114 of FIG. 1, or other electronic device configured and operable as described herein.

Figure 4:
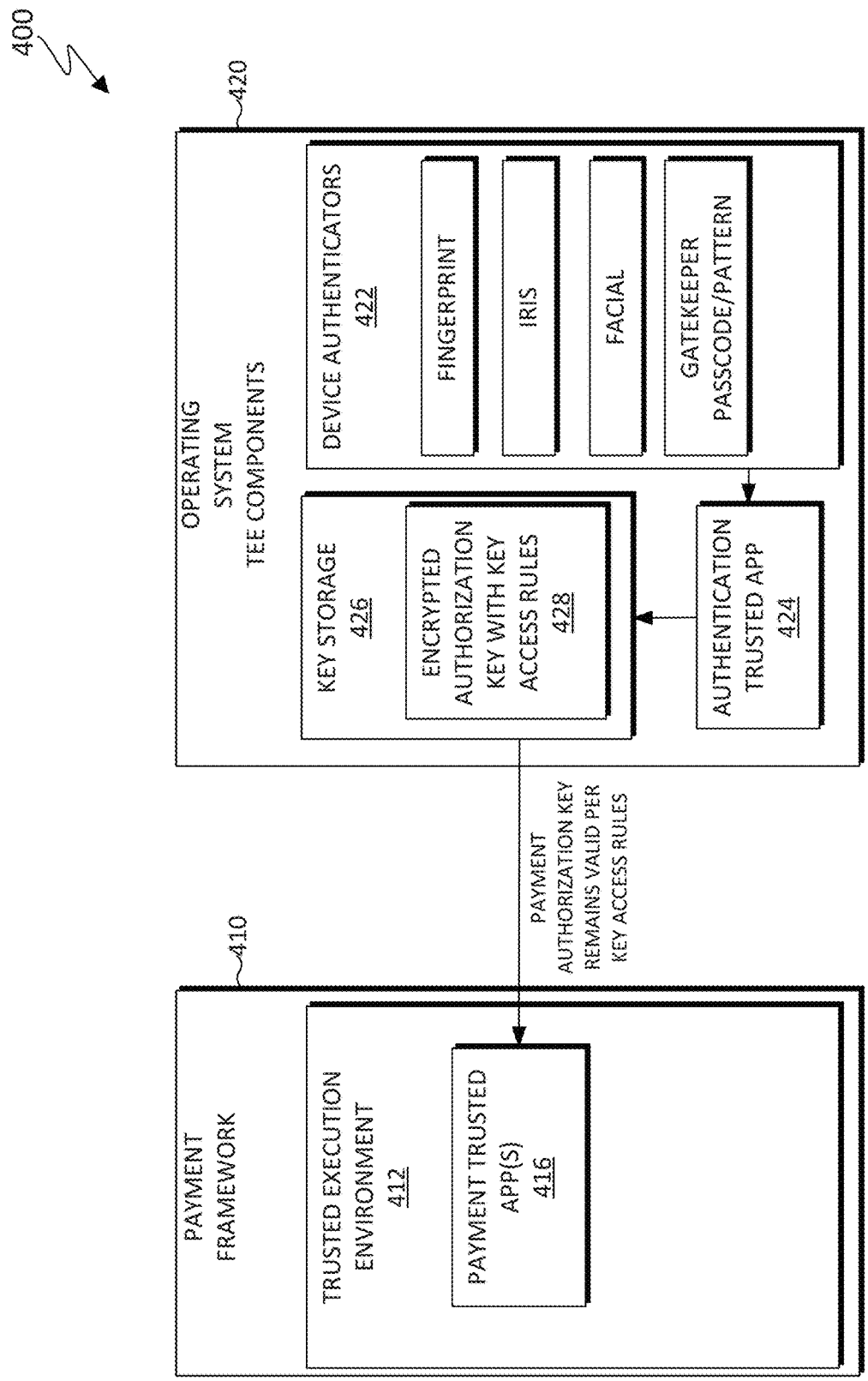
FIG. 4 illustrates a block diagram of an example of payment processing elements of an electronic device in accordance with this disclosure.

The example of FIG. 4 includes operating system TEE components 420 that execute within the TEE and are included in or controlled by the operating system. The operating system TEE components 320 of electronic device 300 include device authenticator trusted apps 322 that collect user authentication data such as fingerprints, iris images, facial images, passcodes, patterns, and others, such as by controlling and receiving inputs from any of the sensors 280 illustrated with respect to FIG. 2.

The payment framework 310 of electronic device 300 includes a trusted execution environment 312, which can be implemented as part of operating system TEE components 320 or as a separate TEE in payment framework 310. TEE 312 implements an authentication trusted app 314 that individually integrates results or other data received from the device authenticator apps 322. TEE 312 implements one or more payment trusted apps 316 that, when properly authorized by authentication trusted app 314, perform payment processing according to financial service provider requirements, e.g., VISA, MASTERCARD, AMERICAN EXPRESS, or other financial service providers. In some cases, there are multiple authentication trusted apps 314, each specifically configured to interact with one or more respective payment trusted apps 316.

In the example of FIG. 3, each payment transaction requires a corresponding, separate authorization process, including performing user authentication. When multiple successive payment transactions are made, each transaction must be individually and separately authorized. For each transaction, one or more of the device authenticator apps 322 must collect user authentication data. For each transaction, the user authentication data must be processed by the appropriate device authenticator app 322. For each transaction, the results or other data from the appropriate device authenticator app must be processed by the authentication trusted app 314. For each transaction, the authorization from authentication trusted app 314, such as an encrypted authentication key, must be provided to the corresponding payment trusted app 316 before the transaction can be processed.

The operation of the example of FIG. 3 results in inefficiencies, particularly when a multiple payment transactions are made within a relatively short time or when a payment transaction is made after the electronic device is "unlocked" by a device user authentication or a device user authentication has already been performed for another purpose. The user is required to perform repeated authentications, and the electronic device is required to perform multiple identical processes in order to process each transaction. Further, each payment trusted app 316 must be specifically configured to communicate with a respective authentication trusted app 314, which may require maintenance and reprogramming if either the authentication trusted app 314 or the payment trusted app 316 is updated or otherwise modified. Similarly, each authentication trusted app 314 must be specifically configured to communicate with the device authenticator apps 322, which may require maintenance and reprogramming if either the authentication trusted app 314 or one or more of the device authenticator apps 322 is updated or otherwise modified, which may be particularly likely since the authentication trusted app 314 may be implemented in a separate TEE than the device authenticator apps 322.

FIG. 4 illustrates a block diagram of an example of payment processing elements of an electronic device 400 in accordance with disclosed embodiments, that improves on the example of FIG. 3. Electronic device 400 can be, for example, an electronic device 201 as illustrated in FIG. 2, any of the client devices 106-114 of FIG. 1, or other electronic device configured and operable as described herein.

The example of FIG. 4 includes operating system TEE components 420 that execute within a TEE and are included in or controlled by the operating system. The operating system TEE components 420 of electronic device 400 include device authenticator trusted apps 422 that collect user authentication data such as by controlling and receiving inputs from any of the sensors 280 illustrated with respect to FIG. 2. The user authentication data can include biometric data such as fingerprints, iris images, facial images, and others. The user authentication data can include gatekeeper data such as PINs, passcodes, patterns, and others.

In some cases, device authenticator trusted apps include a gatekeeper subsystem that performs device PIN, pattern, or password authentication in the TEE. One non-exclusive example of an operating system that can be used to implement the operating system TEE components 420 described herein is the ANDROID operating system and its variations.

The operating system TEE components 420 of electronic device 400 also include an authentication trusted app 424 that individual integrates results or other data received from the device authenticator apps 422.

The operating system TEE components 420 of electronic device 400 also include a key storage 426 that stores cryptographic keys, such as encrypted authorization key 428, and other data as described in more detail herein. A payment application, such as a mobile wallet or mobile payment service may, instead of operating directly with authenticators (e.g., fingerprint, iris scanning, facial scanning, other biometrics, passwords, PINs, etc.), borrow authentication results from a key storage 426. One non-limiting example of a key storage 426 that can be used to implement processes as described herein is the ANDROID KEYSTORE key storage system, but other operating-system-based key storage systems and other systems can be used to implement key storage 426, particularly when implemented in a TEE or secure element.

The payment framework 410 of electronic device 400 includes a trusted execution environment 412, which can be implemented as part of operating system TEE components 420 or as a separate TEE in payment framework 410. TEE 412 implements one or more payment trusted apps 416 that, when properly authorized by receiving an authorization key from key storage 426, perform payment processing according to financial service provider requirements, e.g., VISA, MASTERCARD, AMERICAN EXPRESS, or other financial service providers.

The example of FIG. 4 improves on the example of FIG. 4 by reducing the number of repetitive authentication processes that must be performed. In the example of FIG. 4, device authenticator apps 422 collect user authentication data only when required, such as when the electronic device 400 is unlocked or when a payment is requested and payment conditions are not met, as described in more detail below. The user authentication data is processed by the appropriate device authenticator app 422, and the results or other data from the appropriate device authenticator app 422 are processed by the authentication trusted app 414.

Unlike the process of FIG. 3, in the example of FIG. 4, the authentication trusted app 424 stores an encrypted authorization key, with appropriate key access rules specifying payment conditions, in key storage 426. When processing a payment transaction, if the payment conditions specified by the key access rules are satisfied, a payment trusted app receives the stored encrypted authorization key 428 from key storage 426 to process the transaction.

As described in more detail below, disclosed embodiments can securely exchange a secret with a key storage during the payment framework 410 initialization or at other times. Key storage 426 may provide a process to import secrets directly from payment trusted app. The secret may never leave the TEE and as such may never be exposed to the real-world execution environment. This secure exchange may also provide fine-grain control for defining key access rules for the secret.

The key access rules describe payment conditions under which the encrypted authorization key 428 is permitted to be accessed or used for authorizing payment. The payment conditions can include a device user authentication requirement that a new device user authentication is required to use the payment authorization key. The payment conditions can include a biometric authentication requirement that indicates that device user authentication using biometric data such as fingerprints, iris images, facial images, and others are required to use the payment authorization key. The payment conditions can include a gatekeeper authentication requirement that indicates that device user authentication using gatekeeper data such as PINs, passcodes, patterns, or others are required to use the payment authorization key. The payment conditions can include an unlock requirement that the device must be unlocked to use the payment authorization key. The payment conditions can include a requirement that the payment request must be received within a valid authorization time period to use the payment authorization key, such as within a valid authorization time period from the time of receiving a device user authentication. The payment conditions can include a requirement that device user authentication is required to be received for every receipt of a payment request to use the payment authorization key. The payment conditions can include any of the other payment conditions described herein. Key access rules can be applied in combination, such as requiring both a valid authorization time and a biometric authentication requirement.

The operation of the example of FIG. 4 and the other processes disclosed herein overcome the inefficiencies described with respect to the example of FIG. 3, particularly when a multiple payment transactions are made within a relatively short time, when a payment transaction is made after the electronic device is "unlocked" by a device user authentication, when a device user authentication has already been performed, or under other specific payment conditions. In the example of FIG. 4, if a prior device user authentication has already been performed, whether for device unlocking, a previous payment transaction, or other reason as may be appropriate, the user is not required to perform repeated authentications and the electronic device is required to perform multiple identical processes in order to process each transaction, as long as the payment conditions such as specified by key access rules are satisfied. If the payment conditions are not satisfied, even if there has been a prior successful user authentication, then a new user authentication process can be required.

Further, since the authentication trusted app 424 and the device authenticator apps 422 are both part of the operating system TEE components 420, there is less likely a need for maintenance and reprogramming to ensure that they remain compatible. Since the authentication trusted app 424 stores the encrypted authorization key 428 in the key storage 426, and only the encrypted authorization key 428 is delivered to the payment trusted apps 416, the requirements of maintenance and reprogramming to ensure proper interaction between the authentication trusted app 424 and the payment trusted apps 416 are eliminated.

Figure 5:
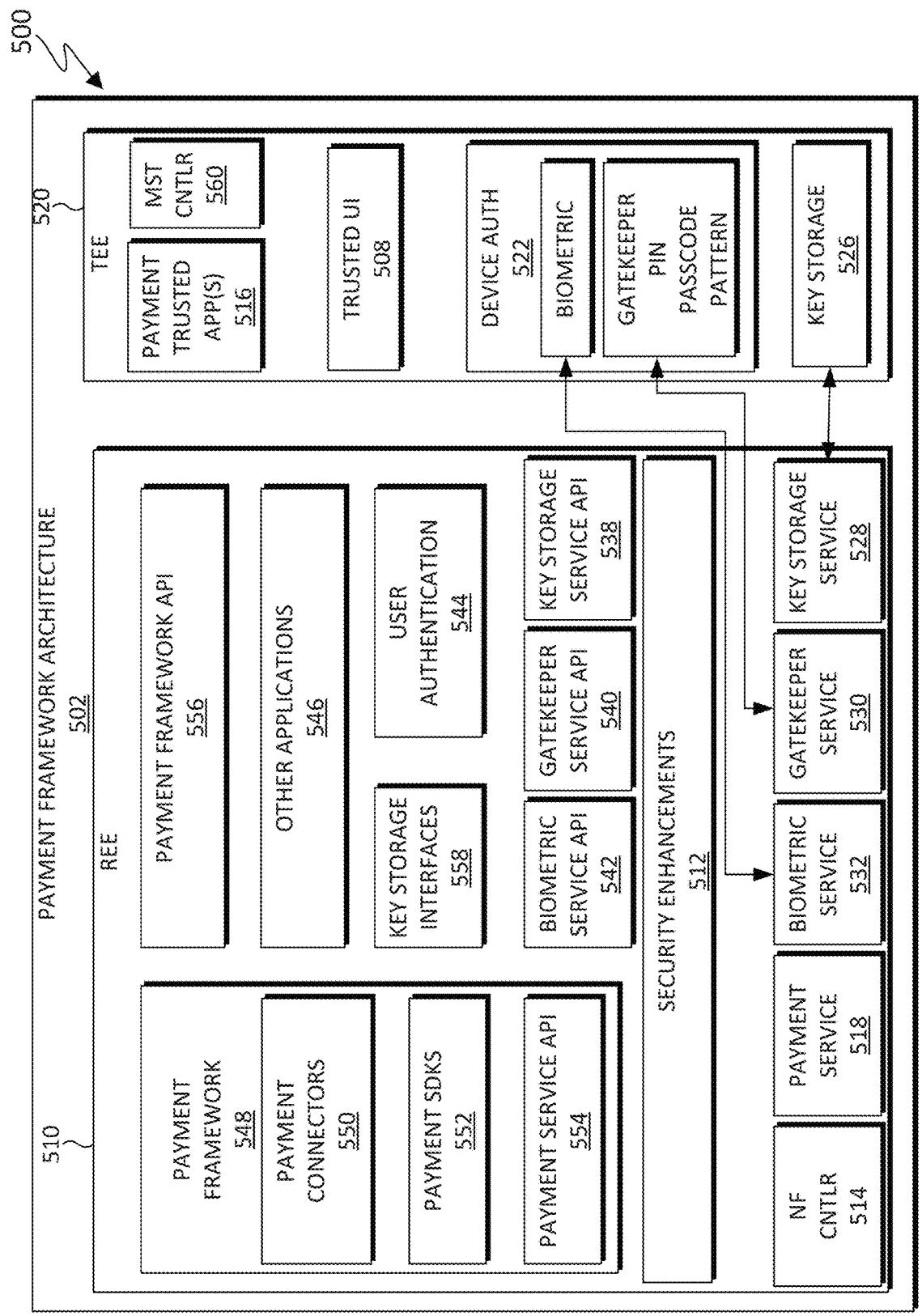
FIGS. 5 and 6 illustrate examples of payment framework architectures of an electronic device in accordance with this disclosure.

FIG. 5 illustrates an example of a payment framework architecture 502 of an electronic device 500 in accordance with disclosed embodiments. Electronic device 500 can be, for example, an electronic device 201 as illustrated in FIG. 2, any of the client devices 106-114 of FIG. 1, or other electronic device configured and operable as described herein. One non-exclusive example of an operating system that can be used to implement the payment framework architecture 502 is the ANDROID operating system and its variations. Other operating systems may also be utilized. Note that the example of FIG. 5 does not include all elements useful or that may be included in such a payment framework architecture, omitting those elements unnecessary for an understanding or the operation of the disclosed embodiments.

In the example of FIG. 5, payment framework architecture 502 of electronic device 500 includes a TEE 520. TEE 520, in a non-limiting example, can be implemented using the ARM TRUSTZONE trusted execution environment. Each of the elements of TEE 520 can be considered as trusted apps.

TEE 520 implements one or more payment trusted apps 516 that perform payment processing according to financial service provider requirements, e.g., VISA, MASTERCARD, AMERICAN EXPRESS, or other financial service providers. Each of the payment trusted apps 516 can also have an associated magnetic secure transmission (MST) interface that generates and transmits a magnetic signal from electronic device 500 to a payment terminal card reader for further processing. The MST interface of each trusted payment app 516 can interact with MST controller 560.

TEE 520 implements device authenticator trusted apps 522 that collect user authentication data such as by controlling and receiving inputs from any of the sensors 280 illustrated with respect to FIG. 2. The user authentication data can include biometric data such as fingerprints, iris images, facial images, and others. The user authentication data can include gatekeeper data such as PINs, passcodes, patterns, and others. In some cases, device authenticator trusted apps include a gatekeeper trusted app that performs device PIN, pattern, or password authentication in the TEE. The gatekeeper trusted app, in some embodiments, can authenticate user passwords and patterns and generate authentication tokens used to validate that an authentication was done for a particular user at a particular point in time. In some cases, device authenticator trusted apps include a biometric trusted app that collects biometric user authentication data such as fingerprints, iris images, and/or facial images, to validate that an authentication was done for a particular user at a particular point in time.

TEE 520 implements key storage 526 that stores cryptographic keys, such as encrypted authorization keys and encrypted payment authorization keys, and other data as described in more detail herein. One non-limiting example of a key storage 526 that can be used to implement processes as described herein is the ANDROID KEYSTORE key storage system. Key storage 526 can also be implemented using the ANDROID KEYMASTER trusted application to provide the secure key generation, access control, and storage operations as described herein. Other operating-system-based key storage systems and other systems can be used to implement key storage 526, particularly when implemented in a TEE or secure element.

TEE 520 can implement a trusted user interface (UI) 508 for securely interacting with a user of electronic device 500.

In the example of FIG. 5, payment framework architecture 502 of electronic device 500 includes a rich execution environment (REE) 510. A REE, in general, refers to the normal operating system environment as opposed to the TEE 520. REE 510 provides the environment for most operating system services that do not require TEE 520. In this example, REE 510 includes security enhancements 512, which provides a more-secure environment for those elements illustrated, in this figure, below security enhancements 512. Security enhancements 512 can be implemented, for example, by the SE FOR ANDROID software system or by the SAMSUNG KNOX software system. However, security enhancements 512 are not necessary for any specific implementation of the disclosed embodiments.

As illustrated in this example, the more-secure environment protects elements including near-field controller 514, payment system service 518, biometric service 532, gatekeeper service 530, and key storage service 528. Near-field controller 514 enables the electronic device 500 to perform near-field communications (NFC) with external devices, including payment transactions. Key storage service 520, in conjunction with key storage service API 530, provides an interface between key storage 526 in TEE 520 and elements in REE 510 to enable messaging as further described herein. Similarly, gatekeeper service 530, in conjunction with gatekeeper service API 540, provides an interface between the gatekeeper device authenticator trusted apps 522 in TEE 520 and elements in REE 510. Similarly, biometric service 532, in conjunction with biometric service API 542, provides an interface between the biometric device authenticator trusted apps 522 in TEE 520 and elements in REE 510.

REE 510 can provide the operating environment for any number of other applications 546. REE 510 can also provide the operating environment for key storage interfaces 558, which can interface with other applications 546 and any other elements of REE 510 to enable interaction with key storage 526 via key storage service API 538 and key storage service 528. REE 510 can also provide the operating environment of user authentication apps 544, which perform device user authentication processes to receive inputs, such as by using any of the sensors 280 illustrated with respect to FIG. 2, to provide data to device authenticator trusted apps 522 to perform the device user authentication processes.

REE 510 can provide the operating environment for payment framework 548, which includes the elements necessary for processing payments once authenticated. These elements can include payment connectors 550, which connect to the financial service providers, e.g., VISA, MASTERCARD, AMERICAN EXPRESS, or other financial service providers. These elements can include payment software development kits (SDKs) 552 or other software packages as necessary to support payments to each of the financial service providers, such as NFC payment interfaces, token management applications, and the like. Note that there may be individual payment connectors 550 and payment SDKs 552 corresponding to each different financial service provider.

REE 510 can provide the operating environment for payment service API 554, which enable any of the other applications 546, and the other elements described herein, to use payment services represented by payment connectors 550 and payment SDKs 552 to process payment transactions as necessary. In some cases, other applications can access payment framework 548, and payment service API 554, via payment framework API 556.

Payment framework 548 can include other elements, not shown, as may be useful for specific environments, such as fingerprint and other authentication functions, trusted user interface functions, attestation functions, and others.

Figure 6:
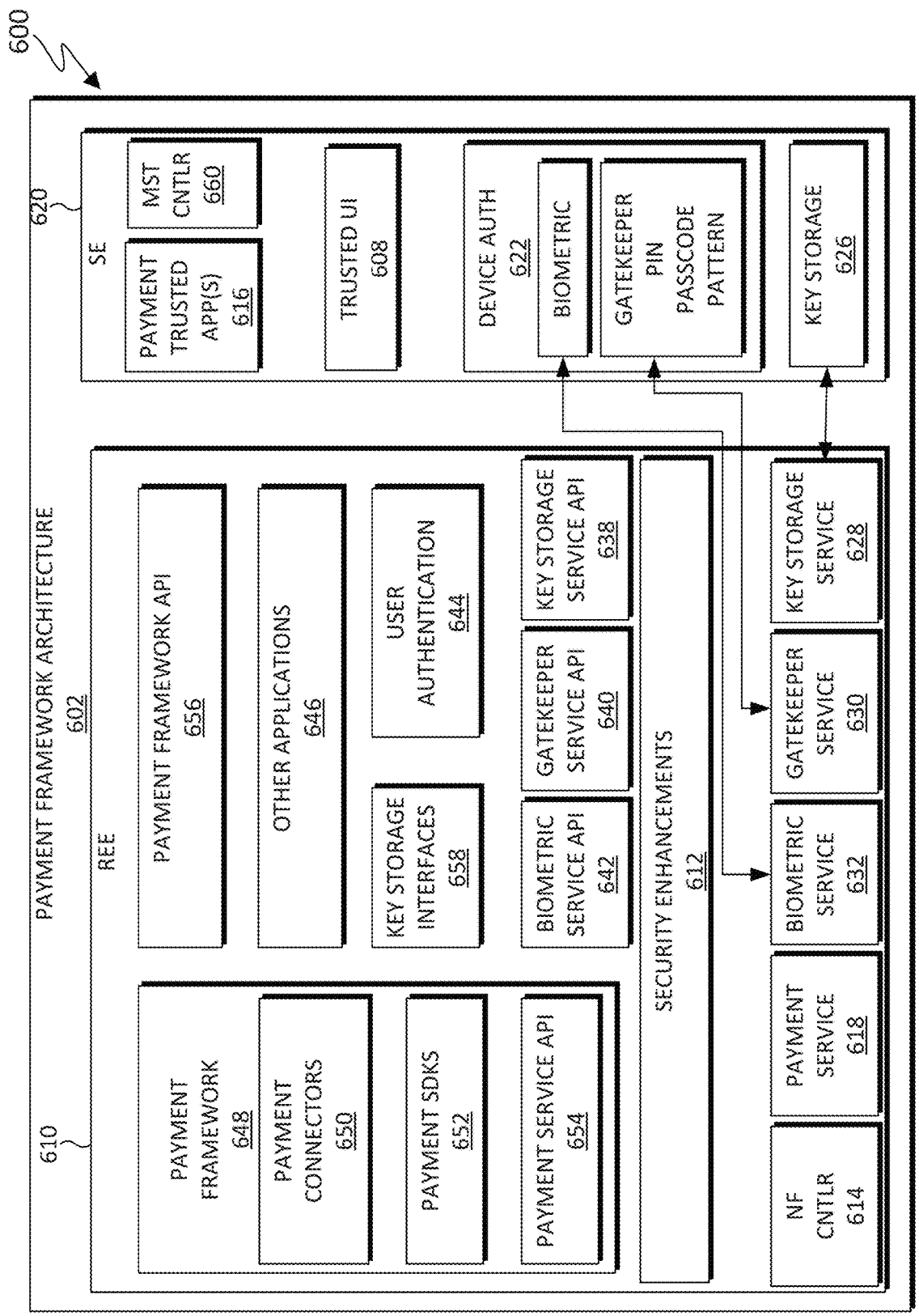

FIG. 6 illustrates an example of a payment framework architecture 602 of an electronic device 600 in accordance with disclosed embodiments. Electronic device 600 can be, for example, an electronic device 201 as illustrated in FIG. 2, any of the client devices 106-114 of FIG. 1, or other electronic device configured and operable as described herein. One non-exclusive example of an operating system that can be used to implement the payment framework architecture 602 is the ANDROID operating system and its variations. Note that the example of FIG. 6 does not include all elements useful or that may be included in such a payment framework architecture, omitting those elements unnecessary for an understanding or the operation of the disclosed embodiments.

In the example of FIG. 6, payment framework architecture 602 of electronic device 600 includes a secure element (SE) 620. SE 620 can be implemented using any hardware-backed security to accomplish the same objectives as a TEE. Each of the elements of described with respect to SE 620 can be considered as trusted apps.

SE 620 implements one or more payment trusted apps 616 that perform payment processing according to financial service provider requirements, e.g., VISA, MASTERCARD, AMERICAN EXPRESS, or other financial service providers. Each of the payment trusted apps 616 can also have an associated magnetic secure transmission (MST) interface that generates and transmits a magnetic signal from electronic device 600 to a payment terminal card reader for further processing. The MST interface of each trusted payment app 616 can interact with MST controller 660.

SE 620 implements device authenticator trusted apps 622 that collect user authentication data such as by controlling and receiving inputs from any of the sensors 280 illustrated with respect to FIG. 2. The user authentication data can include biometric data such as fingerprints, iris images, facial images, and others. The user authentication data can include gatekeeper data such as PINs, passcodes, patterns, and others. In some cases, device authenticator trusted apps include a gatekeeper trusted app that performs device pattern or password authentication in the TEE. The gatekeeper trusted app, in some embodiments, can authenticate user passwords and patterns and generate authentication tokens used to validate that an authentication was done for a particular user at a particular point in time. In some cases, device authenticator trusted apps include a biometric trusted app that collects biometric user authentication data such as fingerprints, iris images, and/or facial images, also to validate that an authentication was done for a particular user at a particular point in time.

SE 620 implements key storage 626 that stores cryptographic keys, such as encrypted authorization keys, such as payment authorization keys, and other data as described in more detail herein. One non-limiting example of a key storage 626 that can be used to implement processes as described herein is the ANDROID KEYSTORE key storage system. Key storage 626 can also be implemented using the ANDROID KEYMASTER trusted application to provide the secure key generation, access control, and storage operations as described herein. Other operating-system-based key storage systems and other systems can be used to implement key storage 626, particularly when implemented in a TEE or secure element.

SE 620 can implement a trusted user interface (UI) 608 for securely interacting with a user of electronic device 600.

In the example of FIG. 6, payment framework architecture 602 of electronic device 600 includes a rich execution environment (REE) 610. A REE, in general, refers to the normal operating system environment as opposed to the secure environment implemented on SE 620. REE 610 provides the environment for most operating system services that do not require SE 620. In this example, REE 610 includes security enhancements 612, which provides a more-secure environment for those elements illustrated, in this figure, below security enhancements 612. Security enhancements 612 can be implemented, for example, by the SE FOR ANDROID software system or by the SAMSUNG KNOX software system. However, security enhancements 612 are not necessary for any specific implementation of the disclosed embodiments.

As illustrated in this example, the more-secure environment protects elements including near-field controller 614, payment system service 618, biometric service 632, gatekeeper service 630, and key storage service 628. Near-field controller 614 enables the electronic device 600 to perform near-field communications (NFC) with external devices, including payment transactions. Key storage service 620, in conjunction with key storage service API 630, provides an interface between key storage 626 in SE 620 and elements in REE 610 to enable messaging as further described herein. Similarly, gatekeeper service 630, in conjunction with gatekeeper service API 640, provides an interface between the gatekeeper device authenticator trusted apps 622 in SE 620 and elements in REE 610. Similarly, biometric service 632, in conjunction with biometric service API 642, provides an interface between the biometric device authenticator trusted apps 622 in SE 620 and elements in REE 610.

REE 610 can provide the operating environment for any number of other applications 646. REE 610 can also provide the operating environment for key storage interfaces 658, which can interface with other applications 646 and any other elements of REE 610 to enable interaction with key storage 626 via key storage service API 638 and key storage service 628. REE 610 can also provide the operating environment of user authentication apps 644, which perform device user authentication processes to receive inputs, such as by using any of the sensors 280 illustrated with respect to FIG. 2, to provide data to device authenticator trusted apps 622 to perform the device user authentication processes.

REE 610 can provide the operating environment for payment framework 648, which includes the elements necessary for processing payments once authenticated. These elements can include payment connectors 650, which connect to the financial service providers, e.g., VISA, MASTERCARD, AMERICAN EXPRESS, or other financial service providers. These elements can include payment software development kits (SDKs) 652 or other software packages as necessary to support payments to each of the financial service providers, such as NFC payment interfaces, token management applications, and the like. Note that there may be individual payment connectors 650 and payment SDKs 652 corresponding to each different financial service provider.

REE 610 can provide the operating environment for payment service API 654, which enable any of the other applications 646, and the other elements described herein, to use payment services represented by payment connectors 650 and payment SDKs 652 to process payment transactions as necessary. In some cases, other applications can access payment framework 648, and payment service API 654, via payment framework API 656.

Payment framework 648 can include other elements, not shown, as may be useful for specific environments, such as fingerprint and other authentication functions, trusted user interface functions, attestation functions, and others.

As described above, disclosed embodiments can exploit secure key storage capabilities of an operating system trusted execution environment, such as, but not limited to, the ANDROID KEYSTORE key storage system or other operating-system-based key storage systems and other systems, particularly in a TEE or secure element.

The key storage capabilities can be used in disclosed embodiments to enable payment authorizations based on a device user authentication and one or more key access rules that describe payment conditions for when a secure key for authorizing payment can be used based on the device user authentication. An implementation example for such processes include a process for initializing the secure key and importing the key into the key storage, and a process for using the secure key for payment authorization.

Figure 7:
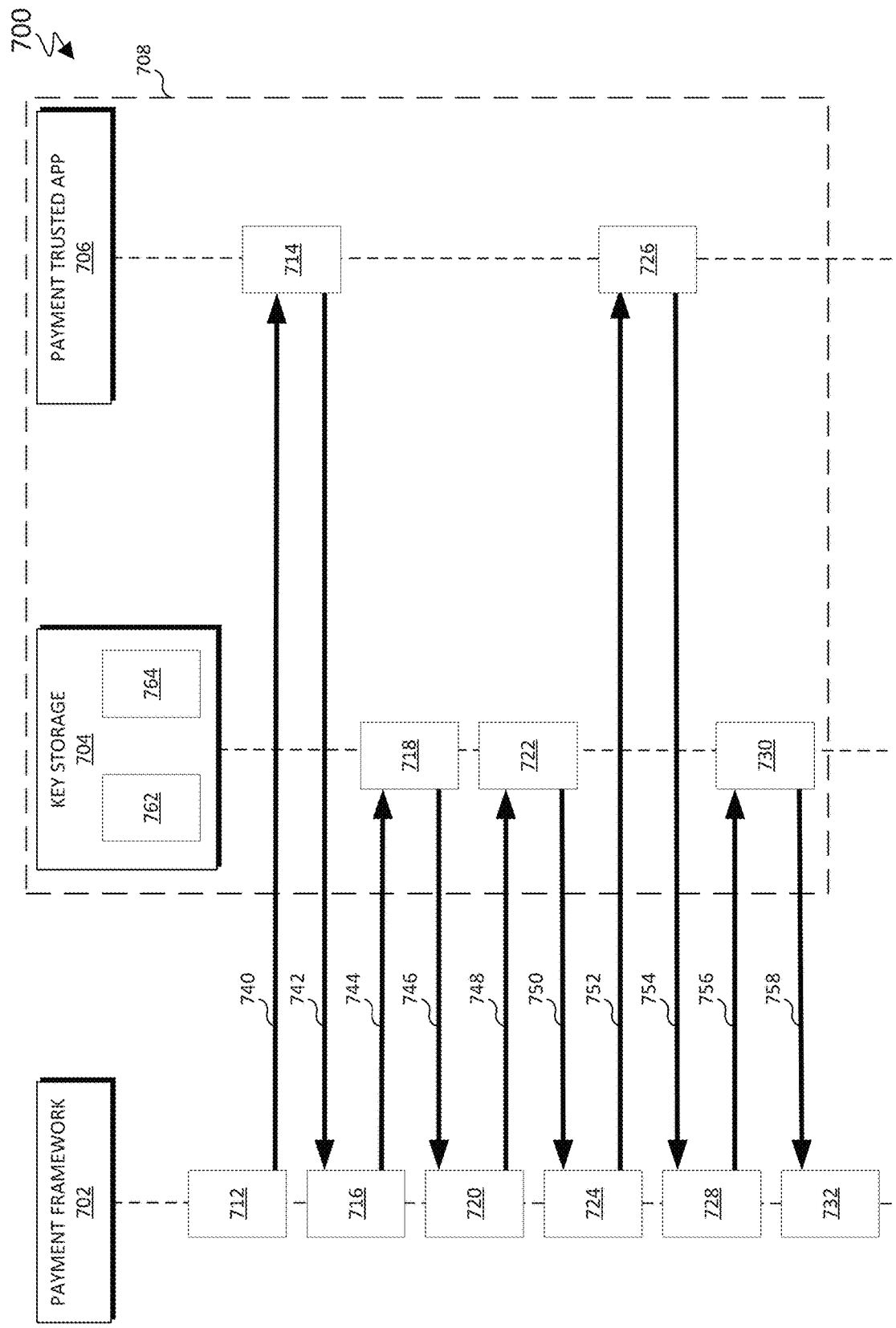
FIG. 7 illustrates an example secure key initialization process in accordance with this disclosure.

FIG. 7 illustrates an example secure key initialization process 700 in accordance with disclosed embodiments that can be performed by an electronic device as described herein. The example process of FIG. 7 is performed by and between a payment framework 702, a key storage 704, and a payment trusted app 706, all implemented in the electronic device. The electronic device that performs process 700 can be, for example, an electronic device 201 as illustrated in FIG. 2, any of the client devices 106-114 of FIG. 1, or other electronic device configured and operable as described herein. In this example, the key storage 704 and the payment trusted app 706 execute in a TEE 708. Payment framework 702 exchanges messages 740-758 with the key storage 704 and the payment authorization trusted app 706 as described below. The secure key initialization process 700 can be performed, for example, on initial setup of the electronic device, when the payment trusted app 706 is first set up, when the payment trusted app 706 is reset or re-installed, or otherwise. Prior to performing the secure key initialization process 700, the electronic device may perform another process to verify that the device has a secure device lock requiring device user authentication. Note that while this process is described in terms of a single payment trusted app 706, it can also be performed with respect to multiple payment trusted apps that use different authorization keys.

In block 712, the payment framework 702 initializes and generates a request for an attestation data to be used for attestation with the payment trusted app 706. The attestation data can be a "nonce" that is a random value that uniquely corresponds to each attestation request.

In message 740, the payment framework 702 sends the request for the attestation data to the payment trusted app 706. As one example, message 740 can be in the form of a generateAttestationChallege( ).

In block 714, the payment trusted app 706 generates the attestation data in response to the request in message 740. In one embodiment, the attestation data can be a 32-byte nonce. Other nonce sizes or types may be utilized.

In message 742, the payment trusted app 706 returns the attestation data to the payment framework 702. As one example, message 740 can be in the form of or include attestationChallenge bytes of the nonce.

In block 716, the payment framework 702 generates a request for a wrapping key pair to be generated by the key storage 704. The request can include the attestation data returned from the payment trusted app 706 in message 742. The request can include a predetermined alias, for example a fixed alias such as "pay_auth_wrapping_key" or an alias corresponding to the payment trusted app 706.

In message 744, the payment framework 702 sends the request for the wrapping key pair to the key storage 704. As one example, message 744 can be in the form of generateKeyPair(alias:pay_auth_wrapping_key, attestationChallenge).

In block 718, the key storage 704 generates and stores the requested wrapping key pair. The wrapping key pair is used for secure key exchange ("wrapping") with the payment trusted app 706. The wrapping key pair can be an RSA keypair, and can be generated according to the predetermined alias. The wrapping key pair can include the defined purpose of "PURPOSE_WRAP_KEY".

In message 746, the key storage 704 sends a success/failure result to the payment framework 702 corresponding to the request for the wrapping key pair. If the wrapping key pair was successfully generated, key storage 704 also sends the wrapping key pair to the payment framework 702.

In block 720, the payment framework 702 generates a request for a wrapping key certificate chain for the wrapping key pair.

In message 748, the payment framework 702 sends the request for the wrapping key certificate chain for the wrapping key pair to the key storage 704. The request for the wrapping key certificate chain for the wrapping key pair can include the predetermined alias to define which wrapping key certificate chain is requested. The request for the wrapping key certificate chain for the wrapping key pair can be in the form of getCertificateChain(alias:pay_auth_wrapping_key).

In block 722, the key storage 704 generates the wrapping key certificate chain for the wrapping key pair. The wrapping key certificate chain can include the attestation data. The wrapping key certificate chain can be "rooted" at a predetermined trusted root certificate authority, such as with a GOOGLE root certificate.

In message 750, the key storage 704 sends the wrapping key certificate chain to the payment framework 702.

In block 724, the payment framework 702 generates a request for a payment authorization key for the payment trusted app 706.

In message 752, the payment framework 702 sends the request for the payment authorization key to the payment trusted app 706 along with the wrapping key certificate chain. For example, the request for the payment authorization key can be in the form of generatePINRandomAndPayAuthKey( ) or upgradePINRandom SO( ).

In block 726, the payment trusted app 706 validates the request for the payment authorization key and generates the payment authorization key for the payment trusted app 706.

In block 726, the payment trusted app 706 can validate the wrapping key certificate chain against the trusted root certificate authority and validate the attestation data included in the wrapping key certificate chain. Validating the attestation data can include verifying that the payment framework 702's package name is listed as the key's owner. Validating the attestation data can include verifying that only the payment framework 702 has access to the wrapping key pair. Validating the attestation data can include validating that the attestation data included in the wrapping key certificate chain matches the attestation data generated in block 714. Validating the attestation data can include any other checks that may be useful.

The payment trusted app 706 can generate a PIN random secure object if secure key initialization process 700 is being performed for the first time, or can upgrade the PIN random secure object (SO) if the secure key initialization process 700 is being re-executed. In both cases, payment trusted app 706 can note that a pay authorization key is initialized or that the PIN random SO has been upgraded and prevent allow a reinitialization unless the payment framework 7021 is reset. The payment trusted app 706 can also generate, for example, a 32-byte random number to be used for the payment authorization key. In one embodiment, the upgrade may be noted in a replay protected memory block (RPMB) which can protect against replay attacks and help ensure data integrity.

The payment trusted app 706 can then generate and store the payment authorization key for payment authorization. For example, the payment authorization key may be in the form of an Advanced Encryption Standard Galios Counter Mode (AES-GCM) 128 key. In one embodiment, generating the payment authorization key can include first appending the 32-byte random number to the PIN random and using the concatenated number as a seed for generating the payment authorization key.

In block 726, the payment trusted app 706 can also generate one or more key access rules for use of the payment authorization key. The key access rules can describe payment conditions as described herein. The payment conditions can include a device user authentication requirement that a new device user authentication is required to use the payment authorization key. The payment conditions can include a biometric authentication requirement that indicates that device user authentication using biometric data such as fingerprints, iris images, facial images, and others are required to use the payment authorization key. The payment conditions can include a gatekeeper authentication requirement that indicates that device user authentication using gatekeeper data such as PINs, passcodes, patterns, or others are required to use the payment authorization key. The payment conditions can include an unlock requirement that the device must be unlocked to use the payment authorization key. The payment conditions can include a requirement that the payment request must be received within a valid authorization time period to use the payment authorization key, such as within a valid authorization time period from the time of receiving a device user authentication. The payment conditions can include a requirement that device user authentication is required to be received for every receipt of a payment request to use the payment authorization key. Any of these non-limiting examples of payment conditions, or any of the others described herein, can be required for any payment authorization key, individually or in combination as may be specified, for example, in the key access rules. Note that the "key access rules" are not limited to any specific form of specifying payment conditions in the embodiments discussed herein.

In block 726, the payment trusted app 706 can also wrap (encrypt) the payment authorization key with the key access rules using the wrapping key pair to generate a wrapped key secure object for importing payment trusted app 706's payment authorization key into the key storage 704. In one embodiment, wrapping the payment authorization key can include creating a Distinguished Encoding Rules (DER)-encoded Abstract Syntax Notation One (ASN.1) formatted wrapped object that can be passed on to key storage 704 for key import. Wrapping the payment authorization key can include using a predetermined alias, such as "pay_auth_key" as the key's alias for the payment authorization key.

In message 754, the payment trusted app 706 returns, to the payment framework 702, the wrapped payment authorization key. In various embodiments, the wrapped payment authorization key can be sent as a part of a SO with the PIN random, the 32-byte random number, and the wrapped payment authorization key (including the key access rules). The wrapped payment authorization key can be designated, for example, as wrappedKeyBytes.

In block 728, the payment framework 702 generates a request to import the wrapped payment authorization key to the key storage 704. The request to import the wrapped payment authorization key can include, for example, the wrapped payment authorization key and the predetermined alias for the payment authorization key.

In message 756, the payment framework 702 sends the request to import the wrapped payment authorization key to the key storage 704. The request can be formatted, for example, as ImportWrappedKey(alias:pay_auth_key, wrappedKeyBytes).

In block 730, the key storage 704 imports the wrapped payment authorization key. Key storage 704 can then unwrap the wrapped payment authorization key using the wrapping key pair and store the unwrapped payment authorization key with the key access rules. These can be stored, for example, as payment authorization key 762 and corresponding key access rules 764.

In message 758, the key storage 704 sends an import success/fail message to the payment framework 702.

In block 732, the payment framework stores the SO with the PIN random, the 32-byte random number, and the wrapped payment authorization key (including the key access rules) for future use.

This example secure key initialization process 700 is complete. Of course, other processes can be used to initialize and store payment authorization keys, with key access rules, in a key storage as disclosed herein, so the example secure key initialization process 700 is not intended to be limiting.

Figure 8:
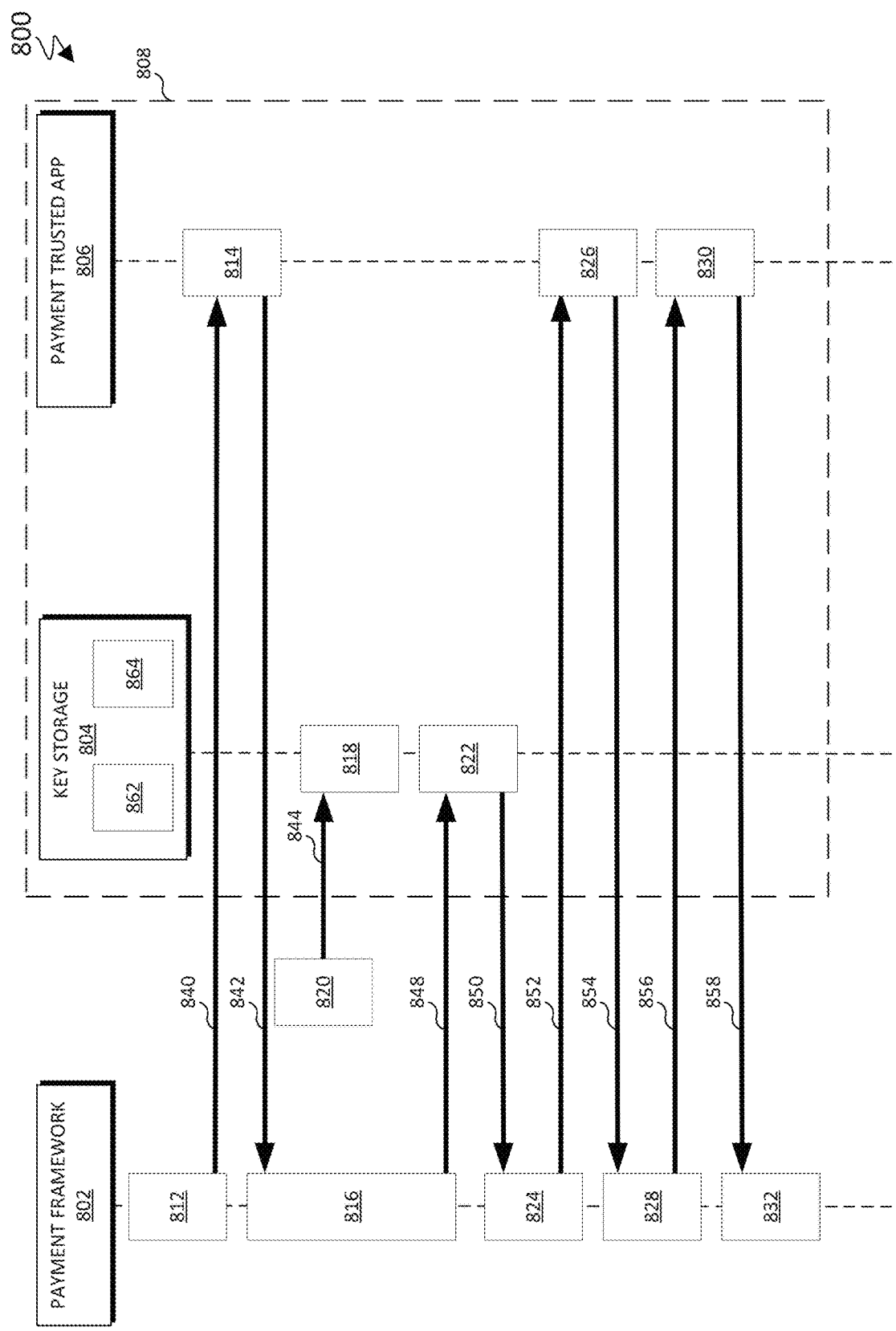
FIG. 8 illustrates an example process for authentication and payment authorization in accordance with this disclosure.

FIG. 8 illustrates an example process 800 for authentication and payment authorization in accordance with disclosed embodiments that can be performed by an electronic device as described herein. The electronic device that performs process 800 can be, for example, an electronic device 201 as illustrated in FIG. 2, any of the client devices 106-114 of FIG. 1, or other electronic device configured and operable as described herein. The example process of FIG. 8 is performed by and between a payment framework 802, a key storage 804, and a payment trusted app 806, all implemented in the electronic device. In this example, the key storage 804 and the payment trusted app 806 execute in a TEE 808. Payment framework 802 exchanges messages 840-842 and 848-858 with the key storage 804 and the payment authorization trusted app 806 as described below. The process 800 can be performed, for example, whenever a request for a payment is made, whether by receiving an input to open a mobile wallet/payment app, receiving a user input on a "pay" selection or similar, receiving another user request to make payment (e.g., an indication that payment will soon be made, such as receiving a user input to initiate a payment or purchase process), receiving a communication from a point-of-sale terminal for payment, or otherwise. Note that while this process is described in terms of a single payment trusted app 806, it can also be performed with respect to multiple payment trusted apps that use different authorization keys. The payment trusted app 806 can be an app that, when properly authorized, performs payment processing according to financial service provider requirements, e.g., VISA, MASTERCARD, AMERICAN EXPRESS, or other financial service providers.

In block 812, the payment framework 802 detects a request for payment, such as one of those described above, and in response, requests an encrypted nonce from the payment trusted app 806.

In message 840, the payment framework 802 sends the request for the encrypted nonce to the payment trusted app 806. As one example, message 840 can be in the form of getEncryptedNonce( ).

In block 814, the payment trusted app 806 generates a nonce and encrypts the nonce using the payment trusted app 806's payment authorization key. The encryption can be, for example, an AES-GCM encryption. The encryption can include appending a 12-byte random initialization vector (IV). Payment trusted app 806 stores the unencrypted nonce for later verification and returns the encrypted nonce, and the random IV, to the payment framework 802. The nonce can be a random value, such as a 32-byte random value, that uniquely corresponds to each payment request.

In message 842, the payment trusted app 806 sends the encrypted nonce and the random IV to the payment framework 802.

In block 816, the payment framework 802 initiates a device user authentication process, such as displaying a device unlock screen. In response, at block 820, a device authenticator app (such as any of those described with respect to FIGS. 4-6), receives and validates a user authentication (such as validating user biometric data or user gatekeeper data) and, if successful, sends an authorization token to key storage 804 in message 844.

In some cases, in block 820, if user has set up fingerprint or other biometric data authentication, it will be given priority, otherwise other device authentication credentials like gatekeeper data are used to authenticate. Similarly, in some cases, on fingerprint failure, other device authentication credentials like gatekeeper data are used. Since only device-level authentication credentials are used, no communication with a server is required. The encrypted nonce can be decrypted below only upon successful device user authentication reflected in the authorization token.

In block 818, while the process of block 816 continues, in response to receiving the authorization token, the key storage 804 unblocks the nonce decryption.

Still in block 816, the payment framework 802 generates a nonce decryption request, including the encrypted nonce and alias of the predetermined alias for the payment authorization key (as in process 700).

In message 848, the payment framework 802 sends the nonce decryption request, including the encrypted nonce and alias of the predetermined alias for the payment authorization key, to the key storage 804. The message can be in the form of decryptNonce(encryptedNonce, alias:pay_auth_key).

In block 822, the key storage 804 uses the stored payment authorization key (corresponding to the predetermined alias) to decrypt the nonce (only if the authorization token was received in message 844). Also in block 822, key storage 804 can read any payment conditions, such as key access rules, that are stored in or in association with the stored payment authorization key for use with the particular payment trusted app 806. The key storage 804, in block 822, can determine whether they payment conditions for the transaction are met, and only decrypt the nonce (and continue the process of FIG. 8) when the payment conditions for the transaction are met. Note that the processes with regard to determining whether the payment conditions are met can be performed by the key storage 804, in various embodiments, as a part of block 822, whether or not similar processes are performed by the payment framework 802 in block 828 below. The stored payment authorization key can be, for example, as payment authorization key 862 and corresponding payment conditions such as key access rules 864.

In message 850, the key storage 804 returns the decrypted nonce to the payment framework 802. The message can be in the form of decryptedNonceBytes.

In block 824, the payment framework 802 generates a request for the payment trusted app 806 to authenticate the payment request. The request to authenticate includes the decrypted/clear nonce.

In message 852, the payment framework 802 sends the request to authenticate the payment request to the payment trusted app 806. The message 852 includes the decrypted/clear nonce and can be in the form authenticateTransaction (decryptedNonce).

In block 826, the payment trusted app 806 determines if there is a match between the decrypted nonce received in message 852 and the stored unencrypted nonce from block 814. Payment trusted app 806 generates and stores a success or failure authorization result.

In message 854, the payment trusted app 806 returns the success or failure authorization result to payment framework 802.

In block 828, the payment framework 802 generates an application cryptogram (AC) request and sends it to payment trusted app 806 in message 856. Also in block 828, payment framework 802 can read any payment conditions, such as key access rules, that are received in or in association with the payment authorization key received from the key storage 804 for use with the particular payment trusted app 806. The payment framework 802, in block 828, can determine whether they payment conditions for the transaction are met, and only generate and send the AC request (and continue the process of FIG. 8) when the payment conditions for the transaction are met. Note that the processes with regard to determining whether the payment conditions are met can be performed by the payment framework 802, in various embodiments, as a part of block 828, whether or not similar processes are performed by the key storage 804 in block 822 above.

In block 830, payment trusted app 806 determines whether payment the authorization result in block 826 was a success, indicating that the payment was authorized, and if so, executes the payment transaction according to the particular financial service provider requirements, typically by generating and using the AC. In some processes, the AC is sent to the financial service provide in online authorization and clearing messages and can be verified by the issuer to confirm the legitimacy of the transaction. In some processes, the AC is sent to an external device such as via near-field communications.

Payment trusted app 806 generates a GEN_AC response to indicate whether the payment transaction was successful and returns the GEN_AC response to payment framework 802.

In block 832, if the GEN_AC response indicates that the payment transaction was successful, payment framework 802 completes the payment process, such as by delivering an indication to a user, and the process ends.

Figure 9:
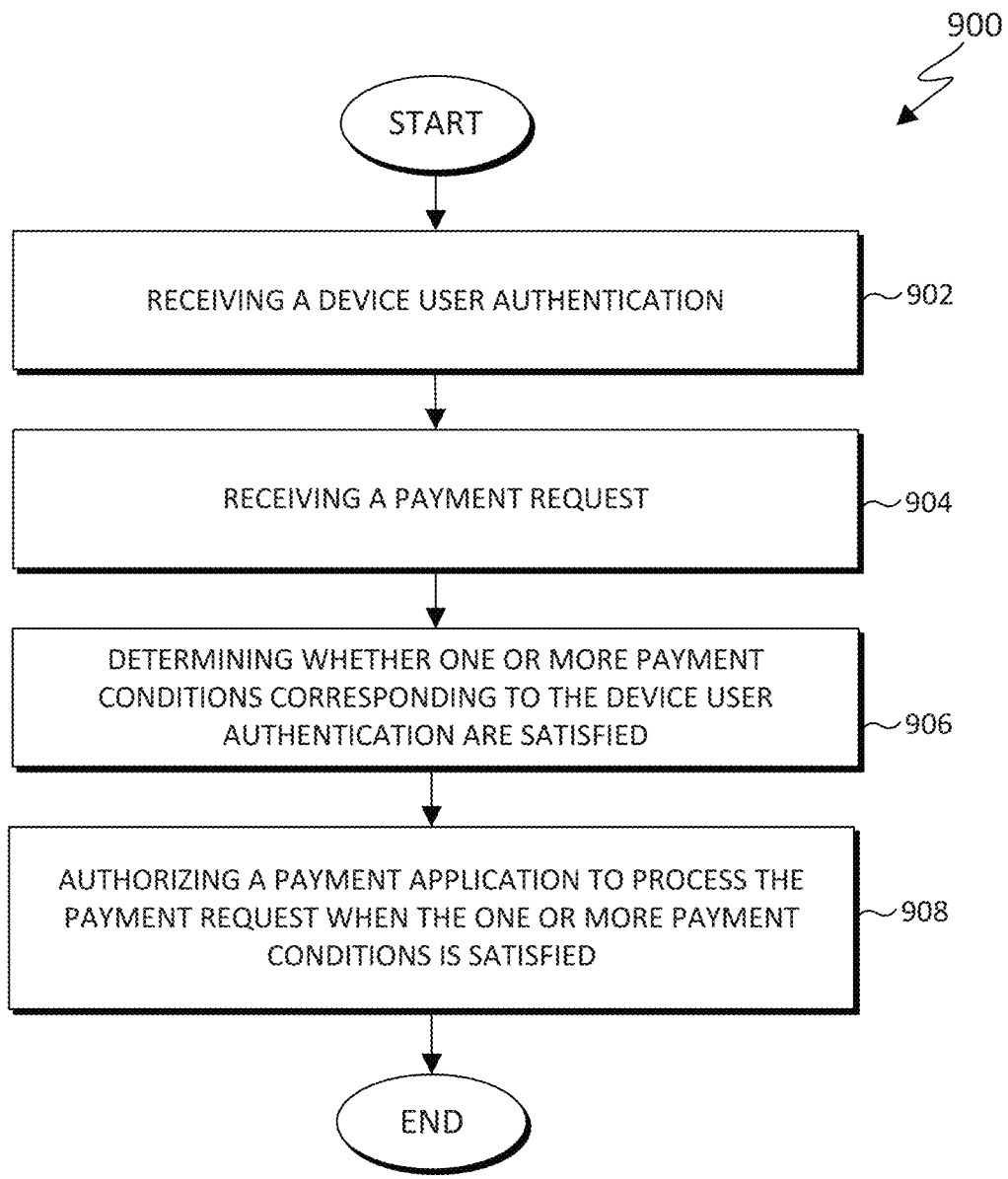
FIG. 9 illustrates an example method for payment authorization in accordance with this disclosure.

FIG. 9 illustrates an example method 900 for payment authorization in accordance with this disclosure. The method 900 may be performed by an electronic device such as an electronic device 201 as illustrated in FIG. 2, any of the client devices 106-114 of FIG. 1, or other electronic device configured and operable as described herein, including those discuss with respect to FIGS. 4-8. Method 700 can be performed, for example, by an electronic device that includes any of the architectures illustrated in FIGS. 4-6. Method 900 can be performed, for example, by an electronic device that performs the processes of FIGS. 7 and/or 8. However, the method 900 can be used with any other suitable system. For purposes of this example, references to electronic device 201 are used. Method 900 can be implemented, for example, as a non-transitory machine-readable medium, such as memory 230, containing instructions, such as application 247, that when executed cause at least one processor, such as processor 220, to perform the method.

In block 902, the electronic device 201 receives a device user authentication. Receiving the device user authentication can include collecting and validating user authentication data to validate a particular user at a particular point in time. The user authentication data can include biometric data such as fingerprints, iris images, facial images, and others. The user authentication data can include gatekeeper data such as PINs, passcodes, patterns, and others. The device user authentication can be received as part of a device "unlock" process, received as part of a payment transaction process, received as part of another process (such as authenticating for an app), or otherwise.

In block 904, the electronic device 201 receives a payment request. The payment request can be any request to perform a payment transaction, whether received from a user, an app, an external device, or otherwise. Specific, non-limiting examples of receiving payment requests include receiving an input to open a mobile wallet or payment app, receiving a user input on a "pay" selection or similar, receiving another user request to make payment (e.g., an indication that payment will soon be made, such as receiving a user input to initiate a payment or purchase process), receiving a communication from a point-of-sale terminal for payment, or otherwise.

In block 906, upon receipt of the payment request, the electronic device 201 determines whether one or more payment conditions corresponding to the device user authentication are satisfied. This determination can be performed, for example, by a payment framework, a key storage system, or both.

As described herein. the payment conditions can be stored as key access rules corresponding to or included in a payment authorization key for a payment application that is used to process the payment request, and the payment authorization key with the key access rules can be stored in a key storage. Determining whether one or more payment conditions corresponding to the device user authentication are satisfied can include accessing the payment authorization key in a key storage and reading the payment conditions corresponding to the payment authorization key.

Each payment application can correspond to different key access rules as may be required by a user, an app, or a financial service provider, so the process of FIG. 8 may use different payment conditions when executed with respect to different payment applications. For example, a MASTER-CARD payment application may include key access rules that specify payment conditions such as a valid authorization time period and a biometric authentication requirement, while a VISA payment application may include key access rules that specify payment conditions such as a gatekeeper authentication requirement and an unlock requirement. As another example, both a MASTERCARD payment application and a VISA payment application may include key access rules that specify payment conditions such as a valid authorization time period, as described below, but the valid authorization time period is different for each payment application. In other embodiments, the electronic device can use key access rules that are applied to multiple payment authorization keys, such as applying an unlock requirement as described below so that no payment authorization key can be used unless the electronic device is unlocked. Any particular payment application can include any one or more of the payment conditions described herein, and the one of more payment conditions for any particular payment application can be applied in any combination, such as by using Boolean operators AND, OR, NOT, or any combination of these operators.

The payment conditions can include a valid authorization time period. Such a time period may be, for example, 10 minutes or 15 minutes, but longer or shorter valid authorization time periods can be used. When the payment conditions include the valid authorization time period, then determining whether the one or more payment conditions are satisfied includes determining whether the payment request was received within the valid authorization time period with respect to the device user authentication. For example, if the valid authorization time period is 10 minutes, then the one or more payment conditions is satisfied when the payment request is received within the 10 minutes of a previous device user authentication The payment conditions can include a biometric authentication requirement that indicates that device user authentication using biometric data such as fingerprints, iris images, facial images, and others is required to use the payment authorization key. When the payment conditions include the biometric authentication requirement, then determining whether the one or more payment conditions are satisfied includes determining whether the device user authentication satisfies the biometric authentication requirement.

Different payment applications can include different payment conditions. For example, a MASTERCARD payment application could include a biometric authentication requirement that any biometric authentication technique can be used, and in such case, a payment by the MASTERCARD payment application could only be used if device user authentication using biometric data such as fingerprints, iris images, or facial images were used, and not if a PIN, password, or passcode were used. By contrast, in this example, a VISA payment application could include a biometric authentication requirement that only a facial recognition authentication technique can be used, and in such case, a payment by the VISA payment application would only be approved if device user authentication using facial images were used, and not if a PIN, password, passcode, or non-facial-recognition biometric authentication were used.

The payment conditions can include a gatekeeper authentication requirement that indicates that device user authentication using gatekeeper data such as PINs, passcodes, patterns, or others is required to use the payment authorization key. When the payment conditions include the gatekeeper authentication requirement, then determining whether the one or more payment conditions are satisfied includes determining whether the device user authentication satisfies the gatekeeper authentication requirement. In other embodiments, the gatekeeper authentication requirement can be specific to certain PINs, passcodes, or patterns; for example, a VISA payment application could include payment conditions with a gatekeeper authentication requirement that specifies that if the device user authentication was performed by a first pattern, then the payment condition is satisfied, but if the device user authentication was performed by a second pattern, the payment condition is not satisfied.

The payment conditions can include an unlock requirement that indicates that the device must be unlocked to use the payment authorization key. When the payment conditions include the unlock requirement, then determining whether the one or more payment conditions are satisfied includes determining whether the device is unlocked.

The payment conditions can include transaction limit requirement that indicates that the payment authorization key can only be accessed if a payment transaction does not exceed a transaction limit, such as a dollar amount. For example, the transaction limit can be $100, so that the payment conditions are only satisfied if the payment transaction is ≤$100. When the payment conditions include the transaction limit requirement, then determining whether the one or more payment conditions are satisfied includes determining whether the payment transaction exceeds a transaction limit. The transaction limit can be stored with key access rules. For example, if an AMERICAN EXPRESS payment application payment conditions included a transaction limit requirement of $100, then the payment condition would be met if the payment transaction was ≤$100 but would not be met if the payment transaction is >$100.

The payment conditions can also include a transaction series time requirement that specifies the amount of time before the current transaction for which other transactions should be considered part of a "series" of payment transaction that should be permitted. For example, the payment conditions can include transaction series time requirement that indicates that the payment authorization key can for be accessed for each transaction if a series of payment transactions occurs within a transaction series time of five minutes of a first authorized payment transaction. In such case, the payment conditions can be satisfied, for each transaction in a series, if each subsequent transaction occurs within 5 minutes of a first authorized transaction in a series. After the 5 minutes from the first authorized transaction have expired, the electronic device may require user re-authentication. When the payment conditions include the transaction series time requirement, then determining whether the one or more payment conditions are satisfied includes determining whether the current payment transaction occurs within a predetermined time of a first payment transaction in a series of payment transactions or, conversely, determining whether the first payment transaction in the series of payment transactions occurred within the predetermined time before the current payment transaction. For example, a payment application can include payment conditions with a transaction series time requirement of 5 minutes. In such a case, when a first payment transaction is made using the payment application, then all payment transactions made using that payment application within the following 5 minutes will meet the transaction series time requirement payment transaction, and any payment transactions requested after the 5 minutes have expired may require a further user authentication.

The transaction limit requirement can also include a transaction series limit requirement that indicates that the payment authorization key can only be accessed if the total amount of a series of payment transactions does not exceed a predetermined series transaction limit. For example, the series transaction limit can be $200, and the payment conditions are satisfied only if the total amount of a series of payment transactions is ≤$200. The payment conditions can include a transaction series time that specifies the amount of time before the current transaction for which other transactions should be considered part of a "series" of payment transactions for applying the transaction series limit. If the current payment transaction in a series of payment transactions would cause the total amount of the series of payment transactions to exceed the series transaction limit, then the payment conditions for the current transaction are not met. When the payment conditions include the transaction series limit requirement, then determining whether the one or more payment conditions are satisfied includes determining whether the total of a series of payment transactions including the current payment transaction occurs would exceed the transaction series limit. In some embodiments, the transaction limit requirement can be applied to a series of payment transactions using multiple payment applications and corresponding payment authorization keys.

The payment conditions can include a location requirement that indicates that the device must be located in a trusted location to use the payment authorization key. When the payment conditions include the location requirement, then determining whether the one or more payment conditions are satisfied includes determining whether the device is physically located in a trusted location, such as a frequently-visited location or a location marked by a user as trusted. For example, the electronic device may mark the geographic location of a user's workplace as trusted, using a location hardware and software such as a global positioning service device and app. When the payment conditions include the location requirement, the electronic device can determine, using the global positioning service device, whether the device is physically located at the user's workplace, and if so, the payment condition is satisfied. If the electronic device is not physically located at the user's workplace (or other trusted location), then the payment condition is not satisfied.

In other cases, the payment conditions can require that a new device user authentication is required, and so the payment conditions cannot be satisfied until a new device user authentication is received. For example, the payment conditions can include a requirement that device user authentication is required to be received for every receipt of a payment request to use a given payment authorization key or that specific circumstances, such as a device reset, indicate that a new device user authentication is required to use the payment authorization key.

The one or more payment conditions can be used in combination. As one example of using the one or more payment conditions in combination, the one or more payment conditions can include both a valid authorization time period and a biometric authentication requirement. In such a case, the one or more payment conditions could be satisfied if both the valid authorization time period is met and a biometric authentication requirement is met. The one or more payment conditions would not be met if the valid authorization time period was met but the biometric authentication requirement was not met (e.g., if only a gatekeeper authentication requirement is met) or if the valid authorization time period was not met even if the biometric authentication requirement was met.

As another example of payment conditions used in combination, the one or more payment conditions can include a transaction limit requirement (e.g., $100), a transaction series time requirement (e.g., 5 minutes), and a transaction series limit requirement (e.g., $200). In such a case, the one or more payment conditions could be satisfied for every payment transaction that is ≤$100, made within 5 minutes of the first payment transaction in a series of payment transactions, as long as the total amount of the series of payment transactions is ≤$200. For any payment transaction that is >$100, made more than 5 minutes after the first payment transaction in the series, or that causes the total of the payment transactions in the series to be >$200, the one or more payment conditions are not met. If these one or more payment conditions are applied to a single payment application, then the one or more payment conditions could be satisfied for every payment transaction made with the single payment application that is ≤$100, made within 5 minutes of the first payment transaction in a series of payment transactions made with the single payment application, as long as the total amount of the series of payment transactions made with the single payment application is ≤$200. If these one or more payment conditions are applied to all payment applications on the electronic device, then the one or more payment conditions could be satisfied for every payment transaction made with any payment application that is ≤$100, made within 5 minutes of the first payment transaction in a series of payment transactions made with any payment application, as long as the total amount of the series of payment transactions made with any of the payment applications is ≤$200.

In other embodiments, some key access rules may be applied by the electronic device, such as by a payment that interacts multiple payment applications, to be enforced across the multiple payment applications. For example, a transaction limit requirement may indicate that any payment authorization key can only be accessed if series of payment transactions, across multiple payment applications, does not exceed a transaction limit, such as a dollar amount. When the payment conditions include the unlock requirement, then determining whether the one or more payment conditions are satisfied includes determining whether the total of a series of payment transactions exceeds a transaction limit. That is, even if a previous transaction with a MASTERCARD-related payment application did not exceed the transaction limit, and a current transaction with an AMERICAN EXPRESS-related payment application does not exceed the transaction limit, electronic device may determine that the total of the previous transaction and the current transaction does exceed the transaction limit, and so determine that the one or more payment conditions is not satisfied and so terminate the current transaction.

In block 908, the electronic device 201 authorizes a payment application to process the payment request when the one or more payment conditions is satisfied. Processing the payment request can include transmitting an application cryptogram to an external device or server via a network communication, a near-field communication, or otherwise.

If the one or more payment conditions is not satisfied, as described herein, then the electronic device 201 can perform a new device user authentication to process the payment request.

Method 900 improves the operation of the electronic device itself by eliminating unnecessary, repetitive authentication processes and improving the efficiency of device processing by storing authentication results for automatic re-authorization in accordance with the payment conditions. Method 900 can exploit secure key storage capabilities of an operating system trusted execution environment, proving efficiencies over devices that must perform additional processes by a payment subsystem. Method 900 provides an improved user experience for more efficient transaction processing.

While an embodiment of the invention may utilize an ANDROID key storage system, other key storage apps may be used that provides features that allow for notification of device lock or unlock results. The results may be securely communicated by trusted authenticators. Additionally, the other key storage apps may allow for importing keys and other secret information in a confidential and authenticated manner. In one example, the manner may use wrapping keys as described herein. The wrapping key may be able to pass attestation validation from the trusted app to the key storage. Embodiments for attestation validation may use a certificate that may need to be signed by the root key on the device. For example, on a device using an ANDROID key storage, a GOOGLE certificate may be used along with the GOOGLE root key. For other key stores that may have features described above, a different certificate and root key may be used that interacts with the particular key store.

While the exemplary embodiments described herein are made in terms of payment processing and authorizing payments, similar processes as disclosed can be used for other functions, such as unlocking finance apps, initiating financial transactions, authorizing money, stock, or securities transfers, or in any other context where device user authentication is useful.

Although FIGS. 7-9 illustrate specific examples of processes that may be performed in accordance with disclosed embodiments, various changes may be made to these processes. For example, while shown as a series of steps, various steps in these figures could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by an electronic device having a processor and a memory coupled to the processor, the method comprising:
   receiving, by the electronic device, a device user authentication based on a first user input received through an input device of the electronic device, the first user input including user authentication data;
   generating, by the electronic device, a payment authorization key based on a validity of the device user authentication, the payment authorization key configured to be received by a payment application as an authentication result that allows a payment transaction to be processed, the validity of the device user authentication obtained from a device authenticator of the electronic device;
   storing the payment authorization key in a key storage, the key storage storing one or more payment conditions corresponding to the payment authorization key;
   receiving, by the electronic device, a payment request to initiate the payment transaction via a communication from an external device or a second user input;
   after receiving the payment request, determining whether the received device user authentication satisfies the one or more payment conditions corresponding to the payment authorization key by reading, within the key storage, the one or more payment conditions corresponding to the payment authorization key, including any payment condition stored in association with the stored payment authorization key for use with the payment application,
      wherein the one or more payment conditions represent one or more conditions under which the key storage permits the payment authorization key to be provided to the payment application as the authentication result based on the device user authentication, and wherein the one or more payment conditions are specified by at least one of a user, a financial service provider, or the payment application; and
   in response to determining that the device user authentication satisfies the one or more payment conditions, authorizing, by the electronic device, the payment application to process the payment request by providing the payment authorization key from the key storage to the payment application.

2. The method of claim 1, wherein:
the one or more payment conditions include a valid authorization time period; and
determining whether the one or more payment conditions are satisfied comprises determining whether the payment request was received within the valid authorization time period with respect to the device user authentication.

3. The method of claim 1, wherein:
the one or more payment conditions include a biometric authentication requirement; and
determining whether the one or more payment conditions are satisfied comprises determining whether the device user authentication satisfies the biometric authentication requirement.

4. The method of claim 1, wherein:
the one or more payment conditions include a gatekeeper authentication requirement; and
determining whether the one or more payment conditions are satisfied comprises determining whether the device user authentication satisfies the gatekeeper authentication requirement.

5. The method of claim 1, wherein:
the one or more payment conditions include an unlock requirement; and
determining whether the one or more payment conditions are satisfied comprises determining whether the electronic device is unlocked.

6. The method of claim 1, wherein determining whether the one or more payment conditions are satisfied comprises accessing the payment authorization key in the key storage and reading the one or more payment conditions corresponding to the payment authorization key.

7. The method of claim 6, wherein the key storage is an operating-system-based key storage system, and the method further comprises:
in response to determining that the one or more payment conditions are not satisfied by the device user authentication, performing a new device user authentication process to process the payment request, wherein the new device user authentication process includes receiving, by the device authenticator of the electronic device, a third user input through the input device of the electronic device, the third user input including the user authentication data; and
in response to authorizing the payment application to process the payment request, processing, by the electronic device, the payment request by transmitting an application cryptogram to an external destination.

8. An electronic device comprising:
a processor; and
a memory operably coupled to the processor, the memory including instructions that, when executed by the processor, cause the processor to:
receive a device user authentication based on a first user input received through an input device of the electronic device, the first user input including user authentication data;
generate a payment authorization key based on a validity of the device user authentication, the payment authorization key configured to be received by a payment application as an authentication result that allows a payment transaction to be processed, the validity of the device user authentication obtained from a device authenticator of the electronic device;
store the payment authorization key in a key storage, the key storage storing one or more payment conditions corresponding to the payment authorization key;
receive a payment request to initiate the payment transaction via a communication from an external device or a second user input;
after receiving the payment request, determine whether the received device user authentication satisfies the one or more payment conditions corresponding to the payment authorization key by reading, within the key storage, the one or more payment conditions corresponding to the payment authorization key, including any payment condition stored in association with the stored payment authorization key for use with the payment application,
wherein the one or more payment conditions represent one or more conditions under which the key storage permits the payment authorization key to be provided to the payment application as the authentication result based on the device user authentication, and wherein the one or more payment conditions are specified by at least one of a user, a financial service provider, or the payment application; and
in response to determining that the device user authentication satisfies the one or more payment conditions, authorize the payment application to process the payment request by providing the payment authorization key from the key storage to the payment application.

9. The electronic device of claim 8, wherein:
the one or more payment conditions include a valid authorization time period; and
the instructions that when executed cause the processor to determine whether the device user authentication satisfies the one or more payment conditions comprise instructions that when executed cause the processor to determine whether the payment request was received within the valid authorization time period with respect to the device user authentication.

10. The electronic device of claim 8, wherein:
the one or more payment conditions include a biometric authentication requirement; and
the instructions that when executed cause the processor to determine whether the device user authentication satisfies the one or more payment conditions comprise instructions that when executed cause the processor to determine whether the device user authentication satisfies the biometric authentication requirement.

11. The electronic device of claim 8, wherein:
the one or more payment conditions include a gatekeeper authentication requirement; and
the instructions that when executed cause the processor to determine whether the device user authentication satisfies the one or more payment conditions comprise instructions that when executed cause the processor to determine whether the device user authentication satisfies the gatekeeper authentication requirement.

12. The electronic device of claim 8, wherein:
the one or more payment conditions include an unlock requirement; and
the instructions that when executed cause the processor to determine whether the device user authentication satisfies the one or more payment conditions comprise instructions that when executed cause the processor to determine whether the electronic device is unlocked.

13. The electronic device of claim 8, wherein the instructions that when executed cause the processor to determine whether the device user authentication satisfies the one or more payment conditions comprise instructions that when executed cause the processor to access the payment authorization key in the key storage and read the one or more payment conditions corresponding to the payment authorization key.

14. The electronic device of claim 13, wherein:
the key storage is an operating-system-based key storage system; and
the instructions when executed further cause the processor to:
in response to determining that the one or more payment conditions are not satisfied by the device user authentication, perform a new device user authentication process to process the payment request, wherein the new device user authentication process includes receiving, by the device authenticator of the electronic device, a third user input through the input device of the electronic device, the third user input including the user authentication data; and
in response to authorizing the payment application to process the payment request, process the payment request by transmitting an application cryptogram to an external destination.

15. A non-transitory machine-readable medium containing instructions that when executed cause at least one processor of an electronic device to:
receive a device user authentication based on a first user input received through an input device of the electronic device, the first user input including user authentication data;
generate a payment authorization key based on a validity of the device user authentication, the payment authorization key configured to be received by a payment application as an authentication result that allows a payment transaction to be processed, the validity of the device user authentication obtained from a device authenticator of the electronic device;
store the payment authorization key in a key storage, the key storage storing one or more payment conditions corresponding to the payment authorization key;
receive a payment request to initiate the payment transaction via a communication from an external device or a second user input;
after receiving the payment request, determine whether the received device user authentication satisfies the one or more payment conditions corresponding to the payment authorization key by reading, within the key storage, the one or more payment conditions corresponding to the payment authorization key, including any payment condition stored in association with the stored payment authorization key for use with the payment application,
wherein the one or more payment conditions represent one or more conditions under which the key storage permits the payment authorization key to be provided to the payment application as the authentication result based on the device user authentication, and wherein the one or more payment conditions are specified by at least one of a user, a financial service provider, or the payment application; and
in response to determining that the device user authentication satisfies the one or more payment conditions, authorize the payment application to process the payment request by providing the payment authorization key from the key storage to the payment application.

16. The non-transitory machine-readable medium of claim 15, wherein:
the one or more payment conditions include a valid authorization time period; and
the instructions that when executed cause the at least one processor to determine whether the one or more payment conditions are satisfied comprise instructions that when executed cause the at least one processor to determine whether the payment request was received within the valid authorization time period with respect to the device user authentication.

17. The non-transitory machine-readable medium of claim 15, wherein:
the one or more payment conditions include a biometric authentication requirement; and
the instructions that when executed cause the at least one processor to determine whether the one or more payment conditions are satisfied comprise instructions that when executed cause the at least one processor to determine whether the device user authentication satisfies the biometric authentication requirement.

18. The non-transitory machine-readable medium of claim 15, wherein:
the one or more payment conditions include a gatekeeper authentication requirement; and
the instructions that when executed cause the at least one processor to determine whether the one or more payment conditions are satisfied comprise instructions that when executed cause the at least one processor to determine whether the device user authentication satisfies the gatekeeper authentication requirement.

19. The non-transitory machine-readable medium of claim 15, wherein:
the one or more payment conditions include an unlock requirement; and
the instructions that when executed cause the at least one processor to determine whether the one or more payment conditions are satisfied comprise instructions that when executed cause the at least one processor to determine whether the electronic device is unlocked.

20. The non-transitory machine-readable medium of claim 15, wherein:
the instructions that when executed cause the at least one processor to determine whether the one or more payment conditions are satisfied comprise instructions that when executed cause the at least one processor to access the payment authorization key in the key storage and read the one or more payment conditions corresponding to the payment authorization key;
the key storage is an operating-system-based key storage system; and
the instructions when executed further cause the at least one processor, in response to determining that the one or more payment conditions are not satisfied by the device user authentication, to perform a new device user authentication process to process the payment request, wherein the new device user authentication process includes receiving, by the device authenticator of the electronic device, a third user input through the input device of the electronic device, the third user input including the user authentication data.

* * * * *